United States Patent
Wang et al.

(10) Patent No.: US 12,061,088 B2
(45) Date of Patent: Aug. 13, 2024

(54) OBSTACLE AVOIDANCE METHOD AND APPARATUS

(71) Applicant: HUAWEI TECHNOLOGIES CO., LTD., Guangdong (CN)

(72) Inventors: Chao Wang, Shanghai (CN); Xinyu Wang, Beijing (CN); Shaoyu Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 417 days.

(21) Appl. No.: 17/317,294

(22) Filed: May 11, 2021

(65) Prior Publication Data

US 2021/0262808 A1 Aug. 26, 2021

Related U.S. Application Data

(63) Continuation of application No. PCT/CN2020/105326, filed on Jul. 28, 2020.

(30) Foreign Application Priority Data

Aug. 12, 2019 (CN) .......................... 201910743055.4

(51) Int. Cl.
*G01C 21/32* (2006.01)
*B60W 30/09* (2012.01)
(Continued)

(52) U.S. Cl.
CPC .............. *G01C 21/32* (2013.01); *B60W 30/09* (2013.01); *B60W 30/0953* (2013.01);
(Continued)

(58) Field of Classification Search
CPC ... G01C 21/32; B60W 30/09; B60W 30/0953; B60W 30/12; B60W 2400/00;
(Continued)

(56) References Cited

U.S. PATENT DOCUMENTS

2014/0324297 A1* 10/2014 Kim ...................... B60W 10/20
701/48
2015/0353082 A1* 12/2015 Lee ...................... B60W 10/20
701/41
(Continued)

FOREIGN PATENT DOCUMENTS

CN 106864458 A 6/2017
CN 107121980 A 9/2017
(Continued)

OTHER PUBLICATIONS

Hamlet et al., "Joint Belief and Intent Prediction for Collision Avoidance in Autonomous Vehicles," 2015 Florida Conference on Recent Advances in Robotics, FCRAR 2015, May 2015, 5 pages.

(Continued)

*Primary Examiner* — Harry Y Oh
*Assistant Examiner* — Danielle M Jackson
(74) *Attorney, Agent, or Firm* — Fish & Richardson P.C.

(57) ABSTRACT

Methods, apparatus, and computer programs stored on a computer-readable storage medium for obstacle avoidance are provided. One example method includes obtaining vehicle information, obstacle information, and a drivable area of a vehicle at a moment t, and processing the drivable area based on the vehicle information and the obstacle information to obtain a potential energy grid map. The method can include obtaining information about a center line of a lane in which the vehicle is currently located, and obtaining a parallel-line track cluster based on the information about the lane center line. The method can include calculating a cost value of each parallel-line track, and performing time-domain filtering on a parallel-line track with a minimum cost value in the parallel-line track cluster to obtain a target track at the moment t specifying a parallel line track that is used by the vehicle to avoid an obstacle.

18 Claims, 14 Drawing Sheets

(51) Int. Cl.
  *B60W 30/095* (2012.01)
  *B60W 30/12* (2020.01)
  *G06V 20/58* (2022.01)
(52) U.S. Cl.
  CPC .............. *B60W 30/12* (2013.01); *G06V 20/58* (2022.01); *B60W 2400/00* (2013.01); *G06V 2201/07* (2022.01)
(58) Field of Classification Search
  CPC ..... B60W 2050/0031; B60W 2552/53; B60W 60/0015; B60W 60/00272; B60W 2520/10; B60W 2554/20; B60W 2554/4041; B60W 30/0956; B60W 30/095; B60W 40/00; B60W 40/02; B60W 40/10; G06V 20/58; G06V 2201/07; G06V 20/588; G01S 13/865; G01S 13/931; G01S 13/867; G08G 1/166; G08G 1/165
  See application file for complete search history.

(56) References Cited

U.S. PATENT DOCUMENTS

| | | | | |
|---|---|---|---|---|
| 2016/0107682 | A1* | 4/2016 | Tan | B62D 6/00 701/41 |
| 2017/0160091 | A1* | 6/2017 | Hwang | G08G 1/166 |
| 2018/0173229 | A1 | 6/2018 | Huang et al. | |
| 2019/0317512 | A1* | 10/2019 | Zhang | G05D 1/0238 |
| 2020/0174481 | A1* | 6/2020 | Van Heukelom | B60W 60/0015 |
| 2022/0001895 | A1* | 1/2022 | Inaba | B60W 30/18145 |
| 2022/0017082 | A1* | 1/2022 | Sakashita | B60W 10/188 |

FOREIGN PATENT DOCUMENTS

| | | |
|---|---|---|
| CN | 107992050 A | 5/2018 |
| CN | 108241370 A | 7/2018 |
| CN | 109324620 A | 2/2019 |
| CN | 109829351 A | 5/2019 |
| CN | 110045376 A | 7/2019 |
| CN | 110550029 A | 12/2019 |
| JP | 2013091443 A | 5/2013 |
| JP | 2018152072 A | 9/2018 |
| JP | 2018185633 A | 11/2018 |
| JP | 2018197048 A | 12/2018 |
| KR | 20170069719 A | 6/2017 |

OTHER PUBLICATIONS

PCT International Search Report and Written Opinion issued in International Application No. PCT/CN2020/105326 on Nov. 12, 2020, 13 pages (partial English translation).

Office Action in Japanese Appln. No. 2021-520334, dated Nov. 8, 2022, 4 pages (with English translation).

Badue et al., "Self-Driving Cars: A Survey," arXiv:1901.04407v2, Oct. 2019, 31 pages.

Extended European Search Report issued in European Application No. 20852477.7 on Jan. 26, 2022, 10 pages.

Nuss et al., "Consistent environmental modeling by use of occupancy grid maps, digital road maps, and multi-object tracking", IEEE Intelligent Vehicles Symposium, Jun. 8-11, 2014, 7 pages.

Office Action in Japanese Appln. No. 2021-520334, mailed on Feb. 28, 2023, 3 pages (with English translation).

* cited by examiner

OBSTACLE AVOIDANCE METHOD AND APPARATUS

CROSS-REFERENCE TO RELATED APPLICATIONS

This application is a continuation of International Application No. PCT/CN2020/105326, filed on Jul. 28, 2020, which claims priority to Chinese Patent Application No. 201910743055.4, filed on Aug. 12, 2019. The disclosures of the aforementioned applications are hereby incorporated by reference in their entireties.

TECHNICAL FIELD

The present invention relates to the field of intelligent automobiles, and in particular, to an obstacle avoidance method and apparatus.

BACKGROUND

Artificial intelligence (AI) is a theory, a method, a technology, and an application system in which a digital computer or a machine controlled by a digital computer is used to simulate, extend, and expand human intelligence to sense an environment, obtain knowledge, and obtain an optimal result based on the knowledge. In other words, artificial intelligence is a branch of computer science that attempts to understand the essence of intelligence and produce a new type of intelligent machine that can react in a manner similar to human intelligence. Artificial intelligence is to study design principles and implementation methods of various intelligent machines, so that the machines have functions of perception, reasoning, and decision-making. Research in the field of artificial intelligence includes robotics, natural language processing, computer vision, decision-making and reasoning, man-machine interaction, recommendation and search, AI basic theories, and the like.

Self-driving is a mainstream application in the field of artificial intelligence. A self-driving technology relies on collaboration among computer vision, radar, a monitoring apparatus, a global positioning system, and the like, so that a motor vehicle can implement self-driving without human intervention. A self-driving vehicle uses various computing systems to help transport a passenger from one location to another. Some self-driving vehicles may require some initial inputs or continuous inputs from an operator (such as a pilot, a driver, or a passenger). The self-driving vehicle allows the operator to switch from a manual operation mode to a self-driving mode or a mode between the manual operation mode and the self-driving mode. Because the self-driving technology does not require a human to drive a motor vehicle, in theory, a human driving error can be effectively avoided, a traffic accident can be reduced, and highway transportation efficiency can be improved. Therefore, the self-driving technology attracts increasingly more attention.

Key technologies of the self-driving technology include: mapping and positioning, environment perception, fusion prediction, decision planning, and underlying control. The planning mainly focuses on vertical speed planning and horizontal path planning. On the basis of traditional path planning, vendors also propose path planning methods applied to different scenarios.

For example, when there is an obstacle in front of a vehicle intruding a current lane, the vehicle needs to stop (or follow a vehicle at a low speed) or perform an obstacle avoidance action to avoid a collision. The obstacle avoidance action is classified into avoidance inside the lane and obstacle avoidance through a lane change. Especially when the obstacle only slightly intrudes into the lane, stopping (or following the vehicle at the low speed) affects traffic efficiency of the lane, and if obstacle avoidance through a lane change is performed, the vehicle interacts with a vehicle in an adjacent lane, which increases impact of an uncontrollable factor (other vehicles on the lane) on the vehicle. Especially in some specific scenarios, current traffic rules do not allow the lane change.

Therefore, in a scenario in which an obstacle slightly intrudes a current lane of a vehicle, how to implement avoidance inside the lane and ensure safety and smoothness of intelligent driving is one of problems that need to be resolved by persons skilled in the art.

SUMMARY

Embodiments of the present invention provide an obstacle avoidance method and apparatus. According to the embodiments of the present invention, when an obstacle in front intrudes a current lane of a vehicle, avoidance inside the lane is performed based on an obtained target track, thereby ensuring safety and smoothness of vehicle driving.

According to a first aspect, an embodiment of the present invention provides an obstacle avoidance method, including: obtaining vehicle information, obstacle information, and a drivable area of a vehicle at a moment t; processing the drivable area based on the vehicle information and the obstacle information to obtain a potential energy grid map, where each grid in the potential energy grid map corresponds to one piece of potential energy information, and the potential energy information is used to represent a probability that the grid is occupied by an obstacle; obtaining information about a lane center line of a lane in which the vehicle is currently located, and obtaining a parallel-line track cluster based on the information about the lane center line, where the parallel-line track cluster includes a plurality of parallel-line tracks, and each of the plurality of parallel-line tracks is parallel to the lane center line; calculating a cost value of each parallel-line track in the parallel-line track cluster according to the potential energy grid map; and performing time-domain filtering on a parallel-line track with a minimum cost value in the parallel-line track cluster based on a target track at a moment t−1 to obtain a target track at the moment t, where the target track at the moment t is used by the vehicle to travel according to the target track at the moment t to avoid the obstacle.

Because a target track at a current moment is obtained by performing filtering on a parallel-line track with a minimum cost value based on a target track at a previous moment, the target track is decoupled from a current position of the vehicle to prevent system oscillation caused by a delay of a control system and a response time of an execution mechanism of the vehicle. This ensures safety and smoothness of the vehicle in a driving process when the vehicle travels and avoids an obstacle based on the target track.

In a feasible embodiment, the vehicle information includes coordinates and dimensions of the vehicle, the obstacle information includes coordinates and dimensions of the obstacle, both the coordinates of the vehicle and the coordinates of the obstacle are coordinates in an East-North-Up geodetic coordinate system (ENU), and the processing the drivable area based on the vehicle information and the obstacle information to obtain a potential energy grid map includes: performing rasterizing processing on the drivable area to obtain a gird map; convert the coordinates of the obstacle from the ENU to a vehicle coordinate system based on the coordinates of the vehicle to obtain relative position coordinates of the obstacle; mapping the obstacle to the grid map based on the relative position coordinates and the dimensions of the obstacle to obtain an occupied area, a hard boundary, and a soft boundary of the obstacle on the grid map, where a distance between the hard boundary and a boundary of the occupied area is D/2, a distance between the soft boundary and the boundary of the occupied area is D, and D is a vehicle width of the vehicle; and performing potential energy processing on the grid map based on the hard boundary, the soft boundary, and the occupied area to obtain the potential energy grid map; where potential energy values of grids within the hard boundary are all a, potential energy values of all grids outside the soft boundary are all b, potential energy values of grids between the hard boundary and the soft boundary gradually decrease from c to b along a direction from the hard boundary to the soft boundary, and a is greater than b, c is less than or equal to a, and c is greater than b.

The soft boundary and the hard boundary are introduced by using the obstacle information, and the drivable area of the vehicle is processed based on the soft boundary and the hard boundary to obtain the potential energy grid map. Subsequently, track prediction is performed based on the potential energy grid map. Compared with the prior art, dependence on sensor precision is reduced.

In a feasible embodiment, the information about the lane center line includes coordinates of a road point on the lane center line, the coordinates are coordinates in the ENU, and the obtaining a parallel-line track cluster based on the information about the lane center line includes:

obtaining the parallel-line track cluster based on the coordinates of the road point on the lane center line and a distance $d_m$, where the distance $d_m$ is a distance between the lane center line and an $m^{th}$ parallel-line track in the parallel-line track cluster.

Further, coordinates of a $k^{th}$ road point on the $m^{th}$ parallel track line are $(x_{mk}^{new}, y_{mk}^{new})$, where $$x_{mk}^{new} = x_k + d_m \times \frac{y_{k+1} - y_k}{\sqrt{(x_{k+1} - x_k)^2 + (y_{k+1} - y_k)^2}}$$

$$y_{mk}^{new} = y_k - d_m \times \frac{x_{k+1} - x_k}{\sqrt{(x_{k+1} - x_i)^2 + (y_{k+1} - y_k)^2}}$$

$(x_k, x_k)$ and $(x_{k+1}, x_{k+1})$ are coordinates of the $k^{th}$ road point and a $(k+1)^{th}$ road point on the lane center line, respectively, and the coordinates are coordinates in the ENU.

In a feasible embodiment, a cost value of a $j^{th}$ parallel-line track in the parallel-line track cluster is obtained based on a potential energy value of a grid in which a road point on the $j^{th}$ parallel-line track is located, and the $j^{th}$ parallel-line track is any one of the plurality of parallel-line tracks.

Further, the cost value of the $j^{th}$ parallel-line track is:

$$\text{TotalCost}_j = w_{background} \cdot a(v) \cdot \text{Offsetcost}(j) + w_{map} \Sigma_{i=1}^{N} b(i) \cdot c(x_i, y_i) \cdot PM(x_i, y_i);$$

where Offsetcost(j) is an offset between the $j^{th}$ parallel-line track and a road center line, a(v) is a function positively correlated to a current vehicle speed of the vehicle, $w_{background}$ is a weight of Offsetcost(j), $w_{map}$ is a weight of the obstacle, b(i) is a function negatively correlated to a distance between an $i^{th}$ road point on the $j^{th}$ parallel track line and the vehicle, $c(x_i, y_i)$ is used to indicate a type of a grid in which the $i^{th}$ road point is located, $PM(x_i, y_i)$ is a potential energy value of the grid in which the $i^{th}$ road point is located, and $w_{map}$ is greater than $w_{background}$.

Data such as the vehicle speed and a distance between the obstacle and the vehicle is used as a calculation parameter when the cost value is calculated, so that the cost value can accurately reflect an advantage and a disadvantage of a parallel-line track or a probability that the parallel-line track is selected, thereby ensuring accuracy and safety of a subsequent target track.

In a feasible embodiment, after the performing time-domain filtering on a parallel-line track with a minimum cost value in the parallel-line track cluster based on a target track at a moment t−1 to obtain a target track at the moment t, the method further includes:

obtaining coordinates $P_t$, a speed $S_t$, and a course angle $A_t$ of the vehicle at the current moment t, and obtaining X pieces of predicted position and pose information based on the coordinates $P_t$, the speed $S_t$, the course angle $A_t$, and the target track at the moment t, where X is an integer greater than 1; determining, based on the X pieces of predicted position and pose information, whether the vehicle is about to collide with the obstacle; and if the vehicle is about to collide with the obstacle, sending braking information to a control module of the vehicle to indicate the control module to control the vehicle to stop moving forward or to decelerate and move forward before a collision occurs.

Detection on the collision with the obstacle is implemented based on a plurality of X pieces of predicted position and pose information. This ensures safety of vehicle traveling based on the target track in real time.

In a feasible embodiment, the obtaining X pieces of predicted position and pose information based on the coordinates $P_t$, the speed $S_t$, the course angle $A_t$, and the target track at the moment t includes:

inputting coordinates $P_{t+x\Delta t}$, a speed $S_{t+x\Delta t}$, a course angle $A_{t+x\Delta t}$, and the target track at the moment t into a prediction model at a moment $t+x\Delta t$, to calculate a speed $S_{t+(x+1)\Delta t}$ and predicted position and pose information $I_{t+(x+1)\Delta t}$ of the vehicle at the moment $t+x\Delta t$, where the predicted position and pose information $I_{t+(x+1)\Delta t}$ includes coordinates $P_{t+(x+1)\Delta t}$ and a course angle $A_{t+(x+1)\Delta t}$; where the X pieces of predicted position and pose information include the predicted position and pose information $I_{t+(x+1)\Delta t}$, $\Delta t$ is a predicted step, and x=0, 1, 2, . . . , or X−1.

According to a second aspect, an embodiment of the present invention provides an obstacle avoidance apparatus, including:

an obtaining unit, configured to obtain vehicle information, obstacle information, and a drivable area of a vehicle at a moment t;

a processing unit, configured to process the drivable area based on the vehicle information and the obstacle information to obtain a potential energy grid map, where each grid in the potential energy grid map corresponds to one piece of potential energy information, and the potential energy information is used to represent a probability that the grid is occupied by an obstacle;

the obtaining unit is further configured to: obtain information about a lane center line of a lane in which the vehicle is currently located, and obtain a parallel-line track cluster based on the information about the lane center line, where the parallel-line track cluster includes a plurality of parallel-line tracks, and each parallel-line track in the parallel-line track cluster is parallel to the lane center line;

a calculation unit, configured to calculate a cost value of each parallel-line track in the parallel-line track cluster according to the potential energy field grid map; and a filtering unit, configured to perform time-domain filtering on a parallel-line track with a minimum cost value in the parallel-line track cluster based on a target track at a moment t−1 to obtain a target track at the moment t, where the target track at the moment t is used by the vehicle to travel according to the target track to avoid the obstacle.

In a feasible embodiment, the vehicle information includes coordinates and dimensions of the vehicle, the obstacle information includes coordinates and dimensions of the obstacle, both the coordinates of the vehicle and the coordinates of the obstacle are coordinates in a geodetic coordinate system ENU, and the processing unit is specifically configured to:

perform rasterizing processing on the drivable area to obtain a gird map; convert the coordinates of the obstacle from the ENU to a vehicle coordinate system based on the coordinates of the vehicle to obtain relative position coordinates of the obstacle; map the obstacle to the grid map based on the relative position coordinates and the dimensions of the obstacle to obtain an occupied area, a hard boundary, and a soft boundary of the obstacle on the grid map, where a distance between the hard boundary and a boundary of the occupied area is D/2, a distance between the soft boundary and the boundary of the occupied area is D, and D is a vehicle width of the vehicle; and perform potential energy processing on the grid map based on the hard boundary, the soft boundary, and the occupied area to obtain the potential energy grid map; where potential energy values of grids within the hard boundary are all a, potential energy values of all grids outside the soft boundary are all b, potential energy values of grids between the hard boundary and the soft boundary gradually decrease from c to b along a direction from the hard boundary to the soft boundary, and a is greater than b, c is less than or equal to a, and c is greater than b.

In a feasible embodiment, the information about the lane center line includes coordinates of a road point on the lane center line, the coordinates are coordinates in the ENU, and in terms of the obtaining a parallel-line track cluster based on the information about the lane center line, the obtaining unit is specifically configured to:

obtain the parallel-line track cluster based on the coordinates of the road point on the lane center line and a distance $d_m$, where the distance $d_m$ is a distance between the lane center line and an $m^{th}$ parallel-line track in the parallel-line track cluster.

Further, coordinates of a $k^{th}$ road point on the $m^{th}$ parallel track line are $(x_{mk}^{new}, y_{mk}^{new})$, where $$x_{mk}^{new} = x_k + d_m \times \frac{y_{k+1} - y_k}{\sqrt{(x_{k+1} - x_k)^2 + (y_{k+1} - y_k)^2}}$$

$$y_{mk}^{new} = y_k - d_m \times \frac{x_{k+1} - x_k}{\sqrt{(x_{k+1} - x_i)^2 + (y_{k+1} - y_k)^2}}$$

$(x_k, x_k)$ and $(x_{k+1}, x_{k+1})$ are coordinates of the $k^{th}$ road point and a $(k+1)^{th}$ road point on the lane center line, respectively, and the coordinates are coordinates in the ENU.

In a feasible embodiment, a cost value of a $j^{th}$ parallel-line track in the parallel-line track cluster is obtained based on a potential energy value of a grid in which a road point on the $j^{th}$ parallel-line track is located, and the $j^{th}$ parallel-line track is any one of the plurality of parallel-line tracks.

Further, the cost value of the $j^{th}$ parallel-line track is:

$$\text{TotalCost}(j) = w_{background} \cdot a(v) \cdot \text{Offsetcost}(j) + w_{map} \Sigma_{i=1}^{Nb}(i) \cdot c(x_i, y_i) \cdot PM(x_i, y_i);$$

where Offsetcost(j) is an offset between the $j^{th}$ parallel-line track and a road center line, $a(v)$ is a function positively correlated to a current vehicle speed of the vehicle, $w_{background}$ is a weight of Offsetcost(j), $w_{map}$ is a weight of the obstacle, $b(i)$ is a function negatively correlated to a distance between an $i^{th}$ road point on the $j^{th}$ parallel track line and the vehicle, $c(x_i, y_i)$ is used to indicate a type of a grid in which the $i^{th}$ road point is located. $PM(x_i, y_i)$ is a potential energy value of the grid in which the $i^{th}$ road point is located, and $w_{map}$ is greater than $w_{background}$.

In a feasible embodiment, the vehicle information includes the coordinates of the vehicle, and a prediction apparatus further includes:

the obtaining unit, further configured to obtain coordinates $P_t$, a speed $S_t$, and a course angle $A_t$ of the vehicle at the current moment t after the filtering unit performs time-domain filtering on the parallel-line track with the minimum cost value in the parallel-line track cluster according to the target track at the moment t−1 to obtain the target track at the moment t:

a prediction unit, configured to obtain X pieces of predicted position and pose information based on the coordinates $P_t$, the speed $S_t$, the course angle $A_t$, and the target track at the moment t, where X is an integer greater than 1;

a collision detection unit, configured to determine, according to predicted position and pose information at a plurality of consecutive moments, whether the vehicle is about to collide with the obstacle; and a sending unit, configured to: if the collision detection unit determines that the vehicle is about to collide with the obstacle, send braking information to a control module of the vehicle to indicate the control module to control the vehicle to stop moving forward or to decelerate and move forward before a collision occurs.

In a feasible embodiment, the prediction unit is specifically configured to:

input coordinates $P_{t+x\Delta t}$, a speed $S_{t+x\Delta t}$, a course angle $A_{t+x\Delta t}$, and the target track at the moment t into a prediction model at a moment $t+x\Delta t$, to calculate a speed $S_{t+(x+1)\Delta t}$ and predicted position and pose information $I_{t+(x+1)\Delta t}$ of the vehicle at the moment $t+x\Delta t$, where the predicted position and pose information $I_{t+(x+1)\Delta t}$ includes coordinates $P_{t+(x+1)\Delta t}$ and a course angle $A_{t+(x+1)\Delta t}$, where the X pieces of predicted position and pose information include the predicted position and pose information $I_{t+(x+1)\Delta t}$, $\Delta t$ is a predicted step, and x=0, 1, 2, . . . , or X−1.

According to a third aspect, an embodiment of this application further provides a self-driving apparatus, including a part or all of the apparatus according to the second aspect.

According to a fourth aspect, an embodiment of this application provides an obstacle avoidance apparatus, including:
a memory storing executable program code; and
a processor, coupled to the memory;
where the processor invokes the executable program code stored in the memory, to perform a part or all of the method according to the first aspect.

According to a fifth aspect, an embodiment of this application provides a computer-readable storage medium, where the computer-readable storage medium stores a computer program, the computer program includes program instructions, and when the program instructions are executed by a processor, the processor is enabled to perform a part or all of the method according to the first aspect.

According to a sixth aspect, a chip is provided, where the chip includes a processor and a data interface, and the processor reads, by using the data interface, instructions stored in a memory, to perform the method in the first aspect.

Optionally, in an implementation, the chip may further include a memory, the memory stores instructions, the processor is configured to execute the instructions stored in the memory, and when the instructions are executed, the processor is configured to perform a part or all of the method in the first aspect.

These aspects or other aspects of the present invention are clearer and easier to understand in descriptions of the following embodiments.

BRIEF DESCRIPTION OF DRAWINGS

To describe the technical solutions in the embodiments of the present invention or in the prior art more clearly, the following briefly describes the accompanying drawings for describing the embodiments or the prior art. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Detailed descriptions are respectively provided below with reference to the accompanying drawings.

Terms used in the present invention are first described herein.

Vehicle execution mechanism; a mechanism by which a vehicle executes instructions, such as an accelerator, a brake pedal, a gear, and a steering wheel.

Grid map: The grid map divides an environment into a series of grids, where each grid is given a potential energy value, and the potential energy value indicates a probability that the grid is occupied.

Potential energy field: When an artificial potential field method is applied to resolving a path planning problem, a target is manually set to a low potential energy point, and an obstacle is set to a high potential energy point, to guide a self-driving vehicle to move from a high potential energy position to a low potential energy position along a change direction of the potential energy field.

Vehicle position: a position of a midpoint of a rear axle on a vehicle.

Position and pose: a position and a pose of an object.

Figure 1A:
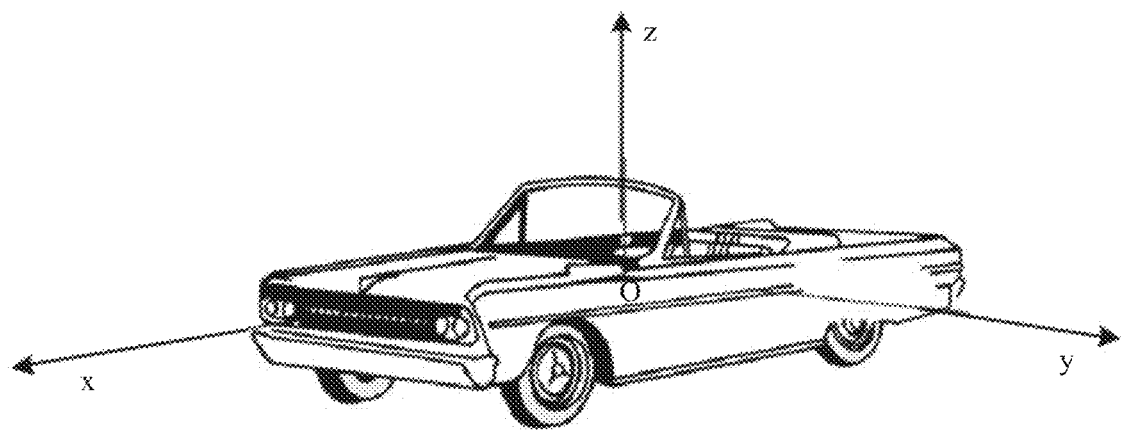
FIG. 1a is a schematic diagram of a vehicle coordinate system.

Vehicle coordinate system: When a vehicle is in a static state on a horizontal road surface, an x-axis is parallel to the ground and points to the front, a z-axis passes through a center of a rear axle and is perpendicularly upward, a y-axis points to a left side of a driver's seat, and the center of the rear axle is an origin O of the coordinate system, as shown in FIG. 1a.

Geodetic coordinate system; is a fixed coordinate system relative to the ground. The geodetic coordinate system is defined in a plurality of manners. For example, the origin may be defined at an initial position of a vehicle, and the x-axis is along a positive direction of a target. After the vehicle moves, a position of the origin and a direction of the x-axis are fixed on the ground and do not move with the vehicle. Alternatively, the origin is defined at a position on the earth, and the x-axis is towards north.

Figure 1B:
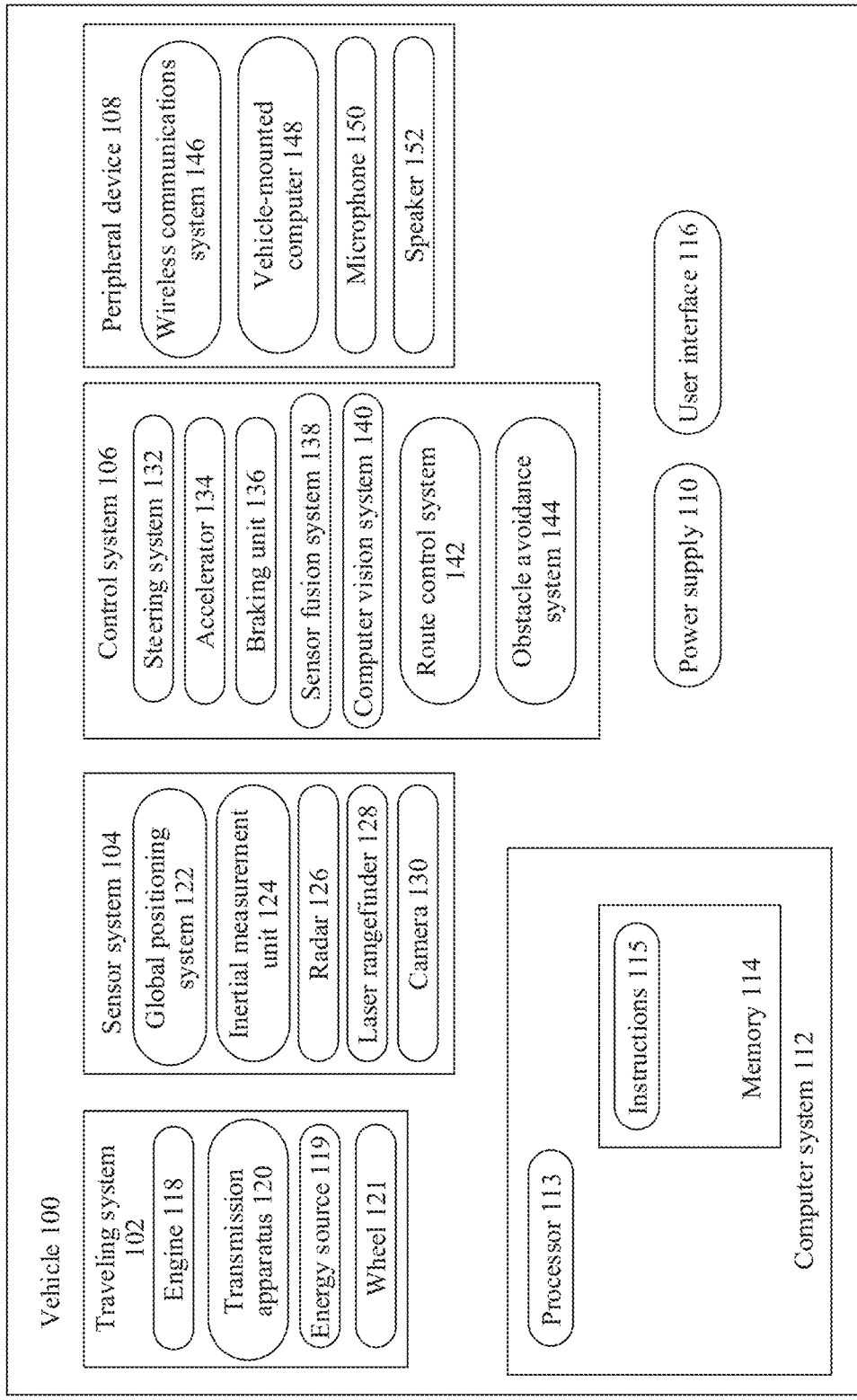
FIG. 1b is a schematic structural diagram of a self-driving car according to an embodiment of the present invention.

FIG. 1b is a functional block diagram of a vehicle 100 according to an embodiment of the present invention. In an embodiment, the vehicle 100 is configured to be in a fully or partially self-driving mode. For example, the vehicle 100 may control itself while in a self-driving mode, and may determine a current status of the vehicle and that of a surrounding environment of the vehicle through a manual operation, to determine a possible behavior of at least one other vehicle in the surrounding environment and determine a confidence level corresponding to a possibility that other vehicle performs the possible behavior, to control the vehicle 100 based on determined information. When the vehicle 100 is in the self-driving mode, the vehicle 100 may be configured to operate without interacting with a person.

The vehicle 100 may include various subsystems, such as a traveling system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, each subsystem and element of the vehicle 100 may be interconnected in a wired or wireless manner.

The traveling system 102 may include a component that provides power for motion of the vehicle 100. In an embodiment, the traveling system 102 may include an engine 118, an energy source 119, a transmission apparatus 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

An example of the energy source 119 includes gasoline, diesel, another petroleum-based fuel, propane, another compressed gas-based fuel, ethanol, a solar panel, a battery, and another power source. The energy source 119 may also provide energy for another system of the vehicle 100.

The transmission apparatus 120 may transmit mechanical power from the engine 118 to the wheel 121. The transmission apparatus 120 may include a gearbox, a differential gear, and a drive axle. In an embodiment, the transmission apparatus 120 may further include another device, such as a clutch. The drive axle may include one or more shafts that may be coupled to one or more wheels 121.

The sensor system 104 may include several sensors that sense information about an environment around the vehicle 100. For example, the sensor system 104 may include a positioning system 122 (the positioning system may be a GPS system, or may be a BeiDou system or another positioning system), an inertial measurement unit (IMU) 124, radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of the sensors may be used to detect an object and a corresponding characteristic (a position, a shape, a direction, a speed, or the like) of the object. This detection and recognition is a key function of a safe operation of the autonomous vehicle 100.

The positioning system 122 may be configured to estimate a geographical position of the vehicle 100. The IMU 124 is configured to sense changes in a position and a direction of the vehicle 100 based on inertial acceleration. In an embodiment, the IMU 124 may be a combination of an accelerometer and a gyroscope.

The radar 126 may use a radio signal to sense an object in a surrounding environment of the vehicle 100. In some embodiments, in addition to sensing the object, the radar 126 may be further configured to sense a speed and/or a forward direction of the object.

The laser rangefinder 128 may use a laser to sense an object in an environment in which the vehicle 100 is located. In some embodiments, the laser rangefinder 128 may include one or more laser sources, a laser scanner, one or more detectors, and another system component.

The camera 130 may be configured to capture a plurality of images of a surrounding environment of the vehicle 100. The camera 130 may be a static camera or a video camera.

The control system 106 controls operations of the vehicle 100 and a component of the vehicle 100. The control system 106 may include various elements, including a steering system 132, an accelerator 134, a braking unit 136, a sensor fusion algorithm 138, a computer vision system 140, a route control system 142, and an obstacle avoidance system 144.

The steering system 132 may be operated to adjust a forward direction of the vehicle 100. For example, the steering system may be a steering wheel system in an embodiment.

The accelerator 134 is configured to control an operating speed of the engine 118 and further control a speed of the vehicle 100.

The braking unit 136 is configured to control the vehicle 100 to decelerate. The braking unit 136 may use friction to slow down the rotation of the wheel 121. In another embodiment, the braking unit 136 may convert kinetic energy of the wheel 121 into an electric current. Alternatively, the braking unit 136 may slow down the rotation of the wheel 121 in another manner to control the speed of the vehicle 100.

The computer vision system 140 may be operated to process and analyze the images captured by the camera 130, to recognize an object and/or a feature in the surrounding environment of the vehicle 100. The object and/or the feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of an object, and the like.

The route control system 142 is configured to determine a driving route of the vehicle 100. In some embodiments, the route control system 142 may determine the driving route for the vehicle 100 in combination with data from the sensor fusion system 138, the GPS 122, and one or more predetermined maps.

The obstacle avoidance system 144 is configured to recognize, evaluate, and avoid or cross a potential obstacle in the environment of the vehicle 100 in another manner.

Certainly, in an example, the control system 106 may add or alternatively include components other than those shown and described. Alternatively, some of the components shown above may be reduced.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further receive a user input by operating the vehicle-mounted computer 148. The vehicle-mounted computer 148 may be operated by using a touchscreen. In another case, the peripheral device 108 may provide a means for the vehicle 100 to communicate with another device in the vehicle. For example, the microphone 150 may receive audio (for example, a voice command or another audio input) from the user of the vehicle 100. Similarly, the speaker 152 may output audio to the user of the vehicle 100.

The wireless communications system 146 may perform wireless communication with one or more devices directly or through a communications network. For example, the wireless communications system 146 may use 3G cellular communication, such as CDMA, EVDO, and GSM/GPRS; or 4G cellular communication, such as LTE; or 5G cellular communication. The wireless communications system 146 may communicate with a wireless local area network (WLAN) by using WiFi. In some embodiments, the wireless communications system 146 may directly communicate with a device by using an infrared link, Bluetooth, or ZigBee. Other wireless protocols, for example, various vehicle communications systems such as the wireless communications system 146, may include one or more dedicated short range communications (DSRC) devices, which may include public and/or private data communications between vehicles and/or roadside stations.

The power supply 110 may supply power to various components of the vehicle 100. In an embodiment, the power supply 110 may be a rechargeable lithium-ion or lead-acid battery. One or more battery packs of such a battery may be configured to supply power to various components of the vehicle 100. In some embodiments, the power supply 110 and the energy source 119 may be implemented together, for example, in some all-electric vehicles.

Some or all functions of the vehicle 100 are controlled by the computer system 112. The computer system 112 may include at least one processor 113. The processor 113 executes instructions 115 stored in a non-transitory computer-readable medium such as a data storage apparatus 114. The computer system 112 may alternatively be a plurality of computing devices that control an individual component or a subsystem of the vehicle 100 in a distributed manner.

The processor 113 may be any conventional processor, such as a commercially available CPU. Alternatively, the processor may be a dedicated device such as an ASIC or another hardware-based processor. Although FIG. 1b functionally illustrates other elements of a processor, a memory, and a computer 110 in the same block, persons of ordinary skill in the art should understand that the processor, the computer, or the memory may actually include a plurality of processors, computers, or memories that may or may not be stored in the same physical housing. For example, the memory may be a hard disk drive or another storage medium located in a housing different from that of the computer 110. Therefore, a reference to a processor or a computer is understood to include a reference to a set of processors, computers, or memories that may or may not be operated in parallel. Unlike using a single processor to perform steps described herein, some components such as a steering component and a deceleration component each may have its own processor, and the processor performs only calculations related to component-specific functions.

In various aspects described herein, the processor may be located far away from the vehicle and perform wireless communication with the vehicle. In another aspect, some of processes described herein are performed on a processor arranged in the vehicle, while others are performed by a remote processor, including taking a necessary step to perform a single manipulation.

In some embodiments, the data storage apparatus 114 may include the instructions 115 (for example, program logic), and the instructions 115 may be executed by the processor 113 to perform various functions of the vehicle 100, including the functions described above. The data storage apparatus 114 may also include additional instructions, including instructions for sending data to, receiving data from, interacting with, and/or controlling the traveling system 102, the sensor system 104, the control system 106, and one or more of the peripheral devices 108.

In addition to the instructions 115, the data storage apparatus 114 may store data, for example, road map and route information; a position, a direction, a speed, and other vehicle data of a vehicle; and other information. Such information may be used by the vehicle 100 and the computer system 112 during operation of the vehicle 100 in an autonomous, semi-autonomous and/or manual mode.

For example, at a moment t, coordinates of the vehicle are obtained by using the global positioning system 122 in the sensor system 104. The processor 113 further obtains a speed of the vehicle based on coordinates at different moments, obtains a course angle of the vehicle by using the inertial measurement unit 124, and obtains a distance between the vehicle and an obstacle by using the laser rangefinder 128, so that the processor 113 can obtain coordinates of the obstacle based on the distance and the coordinates of the vehicle. For a moving obstacle, the processor 113 may obtain a speed of the obstacle by using coordinates at different moments. A drivable area of the vehicle and dimensions of the obstacle are obtained by using the camera 130. The processor 113 processes the drivable area of the vehicle based on the coordinates and dimensions of the vehicle and the coordinates and the dimensions of the obstacle to obtain a potential energy grid map. The global positioning system 122 obtains coordinates of a road point on a lane center line. The processor 113 obtains a parallel-line track cluster of the vehicle based on the coordinates of the road point on the lane center line, then calculates a cost value of each parallel-line track in the parallel-line track cluster based on the potential energy grid map, and then performs time-domain filtering on a parallel-line track with a minimum cost value based on a target track at a moment t−1 to obtain a target track at the moment t. The route control system 142 in the control system 106 controls traveling of the vehicle based on the target track at the moment t, to avoid the obstacle.

The processor 113 obtains predicted position and pose information at a plurality of future consecutive moments based on the coordinates of the vehicle, a speed at a current moment, the course angle, and the target track at the moment t. The obstacle avoidance system 144 performs obstacle avoidance based on the predicted position and pose information at the plurality of future consecutive moments.

The user interface 116 is configured to provide information for or receive information from the user of the vehicle 100. Optionally, the user interface 116 may include one or more input/output devices in a set of peripheral devices 108, for example, a wireless communications system 146, a vehicle-mounted computer 148, a microphone 150, and a speaker 152.

The computer system 112 may control functions of the vehicle 100 based on inputs received from various subsystems (for example, the traveling system 102, the sensor system 104, and the control system 106) and from the user interface 116. For example, the computer system 112 may use an input from the control system 106 to control the steering unit 132 to avoid an obstacle detected by the sensor system 104 and the obstacle avoidance system 144. In some embodiments, the computer system 112 may be operated to provide control over many aspects of the vehicle 100 and its subsystems.

Optionally, one or more of the foregoing components may be installed separately from or associated with the vehicle 100. For example, the data storage apparatus 114 may exist separately from the vehicle 100 partially or completely. The foregoing components may be communicatively coupled together in a wired and/or wireless manner.

Optionally, the foregoing components are merely examples. In actual application, components in the foregoing modules may be added or deleted based on an actual requirement. FIG. 1b should not be understood as a limitation on this embodiment of the present invention.

A self-driving car moving on a road, such as the vehicle 100 above, may recognize an object in an environment around the vehicle to determine an adjustment to a current speed. The object may be another vehicle, a traffic control device, or another type of object. In some examples, each recognized object may be independently considered, and a speed to be adjusted by the self-driving car may be determined based on a feature of the object, such as a current speed, an acceleration, and a distance between the object and the vehicle.

Optionally, the self-driving vehicle 100 or a computing device (such as the computer system 112, the computer vision system 140, or the data storage apparatus 114 in FIG. 1b) associated with the self-driving vehicle 100 may predict a behavior of the recognized object based on the characteristic of the recognized object and a status of the surrounding environment (for example, traffic, rain, and ice on a road). Optionally, each recognized object depends on a behavior of each other. Therefore, all recognized objects may be considered together to predict a behavior of a single recognized object. The vehicle 100 can adjust its speed based on the predicted behavior of the recognized object. In other words, the self-driving car can determine, based on the predicted behavior of the object, a specific stable state (for example, acceleration, deceleration, or stop) to which the vehicle needs to be adjusted. In this process, another factor may also be considered to determine the speed of the vehicle 100, for example, a transverse position of the vehicle 100 on a traveling road, curvature of the road, and proximity of static and dynamic objects.

In addition to providing an instruction of adjusting the speed of the self-driving car, the computing device may provide an instruction of modifying a steering angle of the vehicle 100, so that the self-driving car follows a given track and/or maintains safe horizontal and vertical distances between the self-driving car and an object (for example, a car in an adjacent lane on a road) near the self-driving car.

The vehicle 100 may be a car, a truck, a motorcycle, a bus, a boat, an airplane, a helicopter, a lawn mower, an entertainment car, a playground vehicle, a construction device, a tram, a golf cart, a train, a handcart, and the like. This is not particularly limited in this embodiment of the present invention.

Scenario Example 2: Self-Driving System

Figure 2:
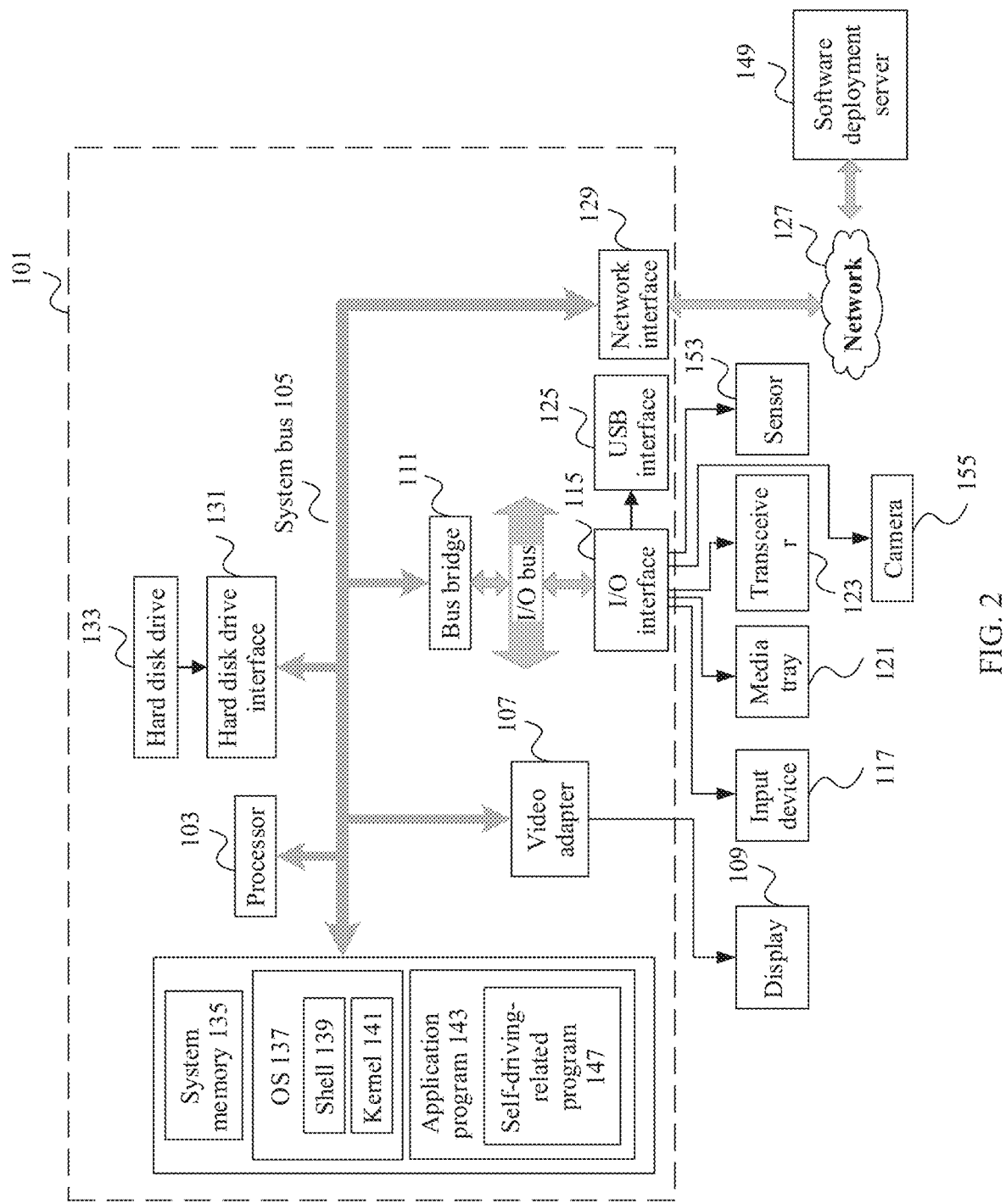
FIG. 2 is a schematic structural diagram of a computer system according to an embodiment of the present invention.

According to FIG. 2, a computer system 101 includes a processor 103, and the processor 103 is coupled to a system bus 105. The processor 103 may be one or more processors, and each processor may include one or more processor cores. A video adapter 107 may drive a display 109, and the display 109 is coupled to the system bus 105. The system bus 105 is coupled to an input/output (I/O) bus 113 by using a bus bridge 111. An I/O interface 115 is coupled to the I/O bus. The I/O interface 115 communicates with a plurality of I/O devices, for example, an input device 117 (such as a keyboard, a mouse, and a touchscreen) and a multimedia tray 121 (such as a CD-ROM and a multimedia interface). A transceiver 123 (which may send and/or receive a radio communication signal), a camera 155 (which may capture static and dynamic digital video images), and an external USB interface 125 are provided. Optionally, an interface connected to the I/O interface 115 may be a USB interface.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural network processor or a combination of a neural network processor and the foregoing conventional processor.

Optionally, in various embodiments described herein, the computer system 101 may be located away from a self-driving vehicle, and may communicate wirelessly with a self-driving vehicle 0. In another aspect, some of processes described herein are performed on a processor disposed in the self-driving vehicle, and others are performed by a remote processor, including taking an action required to perform a single manipulation.

The computer 101 may communicate with a software deployment server 149 by using a network interface 129. The network interface 129 is a hardware network interface, such as a network interface card. A network 127 may be an external network, such as the Internet; or may be an internal network, such as the Ethernet or a virtual private network (VPN). Optionally, the network 127 may also be a wireless network, such as a WiFi network or a cellular network.

A hard disk drive interface is coupled to the system bus 105. The hardware driver interface is connected to a hard disk drive. A system memory 135 is coupled to the system bus 105. Data running in the system memory 135 may include an operating system 137 and an application program 143 of the computer 101.

The operating system includes a shell 139 and a kernel 141. The shell 139 is an interface between a user and the kernel of the operating system. The shell is an outermost layer of the operating system. The shell manages interaction between the user and the operating system: The shell waits for a user's input, explains the user's input to the operating system, and processes various output results of the operating system.

The kernel 141 includes parts in the operating system that are used to manage a memory, a file, a peripheral, and a system resource. The kernel in the operating system directly interacts with hardware, usually runs processes, provides inter-process communication, and provides CPU time slice management, interruption, memory management, I/O management, and the like.

The application program 143 includes a program related to control of car self-driving, for example, a program for managing interaction between the self-driving car and an obstacle on a road, a program for controlling a route or a speed of the self-driving car, and a program for controlling interaction between the self-driving car and another self-driving car on a road. The application program 143 also exists on a system of the software deployment server 149. In an embodiment, when a self-driving-related program 147 needs to be executed, the computer system 101 may download the application program 143 from the software deployment server 149.

A sensor 153 is associated with the computer system 101. The sensor 153 is configured to detect an environment around the computer 101. For example, the sensor 153 may detect an animal, a car, an obstacle, a pedestrian crosswalk, and the like. Further, the sensor may detect an environment around the foregoing object such as the animal, the car, the obstacle, and the pedestrian crosswalk, for example, an environment around the animal, such as another animal appearing around the animal, a weather condition, and brightness of the surrounding environment. Optionally, if the computer 101 is located on the self-driving car, the sensor 153 may be a camera, an infrared sensor, a chemical detector, a microphone, an inertial measurement unit, a laser rangefinder, a positioning system, or the like.

For example, the positioning system in the sensor 153 obtains coordinates of the vehicle and coordinates of a road point on a lane center line, the inertial measurement unit obtains a course angle of the vehicle, the camera obtains a drivable area of the vehicle and dimensions of an obstacle, and the laser rangefinder obtains a distance between the vehicle and the obstacle.

The processor 103 obtains, from a hard disk drive 133 based on the system bus 105 and a hard disk drive interface 131, related data collected by the sensor 153 and the camera 155, to invoke the self-driving-related program 147 in the application program 143 to perform the following method:

obtaining a speed of the vehicle at a moment t based on coordinates of the vehicle at different moments; obtaining coordinates of an obstacle according to a distance between the vehicle and the obstacle and the coordinates of the vehicle; processing a drivable area of the vehicle based on the coordinates and dimensions of the vehicle and the coordinates and dimensions of the obstacle to obtain a potential energy grid map; obtaining a parallel-line track cluster of the vehicle based on coordinates of a road point on a lane center line of a lane in which the vehicle is located, where the parallel-line track cluster includes a plurality of parallel-line tracks; then calculating a cost value of each of the plurality of parallel-line tracks based on the potential energy grid map; then performing time-domain filtering on a parallel-line track with a minimum cost value based on a target track at a moment t−1 to obtain a target track at the moment t; and controlling, based on the target track at the moment t, the vehicle to drive; and obtaining predicted position and pose information at a plurality of future consecutive moments based on the coordinates of the vehicle, a speed at a current moment, a course angle, and the target track at the moment t; and if it is determined, based on the predicted position and pose information, that the vehicle is about to collide with the obstacle, controlling the vehicle to brake to stop moving forward or to decelerate and move forward before collision.

Figure 3:
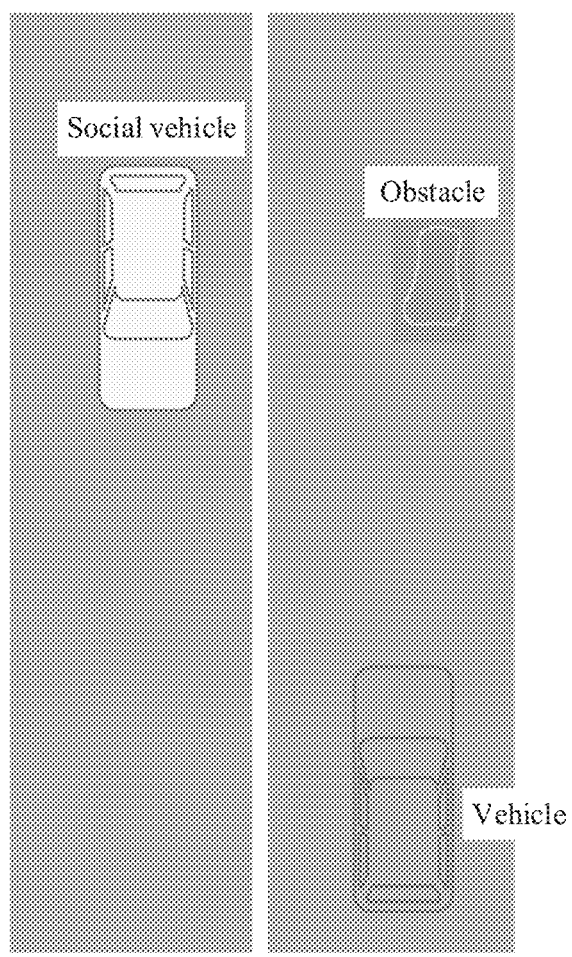
FIG. 3 is a schematic diagram of an application scenario of an obstacle avoidance method according to an embodiment of the present invention.

Refer to FIG. 3. FIG. 3 is a schematic diagram of an application scenario according to an embodiment of the present invention. As shown in FIG. 3, there is an obstacle in front of a vehicle on a current lane slightly intruding the lane, there is an incoming vehicle on an opposite lane, and a traffic sign line in the middle of the two lanes is a solid line. The vehicle cannot change lanes if a lane change is not allowed according to a traffic rule or a traffic flow on an adjacent lane is dense. The vehicle needs to perform avoidance inside the lane to bypass the obstacle to pass through the lane.

The vehicle obtains information about the vehicle, obstacle information, and a drivable area of the vehicle at a moment t; processes the drivable area based on the vehicle information and the obstacle information, to obtain a potential energy raster map, obtain information about a center line of a lane in which the vehicle is currently located and obtain a parallel-line track cluster based on the information about the center line of the lane, where each parallel-line track in the parallel-line track cluster is parallel to the center line of the lane. The vehicle calculates a cost value of each parallel-line track in a parallel-line track cluster based on a potential energy grid map. The time-domain filtering is performed on the parallel-line track with the minimum algebraic value in the parallel-line track cluster based on the target track at the moment t−1, to obtain the target track at the moment t. The vehicle travels based on the target track at the moment t, to avoid an obstacle.

The vehicle obtains coordinates, a speed, and a course angle at a current moment; obtains predicted position and pose information about the vehicle at a plurality of future consecutive moments based on the coordinates, the speed, and the course angle at the current moment and the target track at the moment t; determines, based on the predicted position and pose information at the plurality of consecutive moments, whether the vehicle is about to collide with the obstacle; and generates a virtual wall in front of the obstacle if it is detected that the vehicle is about to collide with the obstacle, so that the vehicle stops in front of the obstacle or decelerates and moves forward, to ensure safety.

Figure 4:
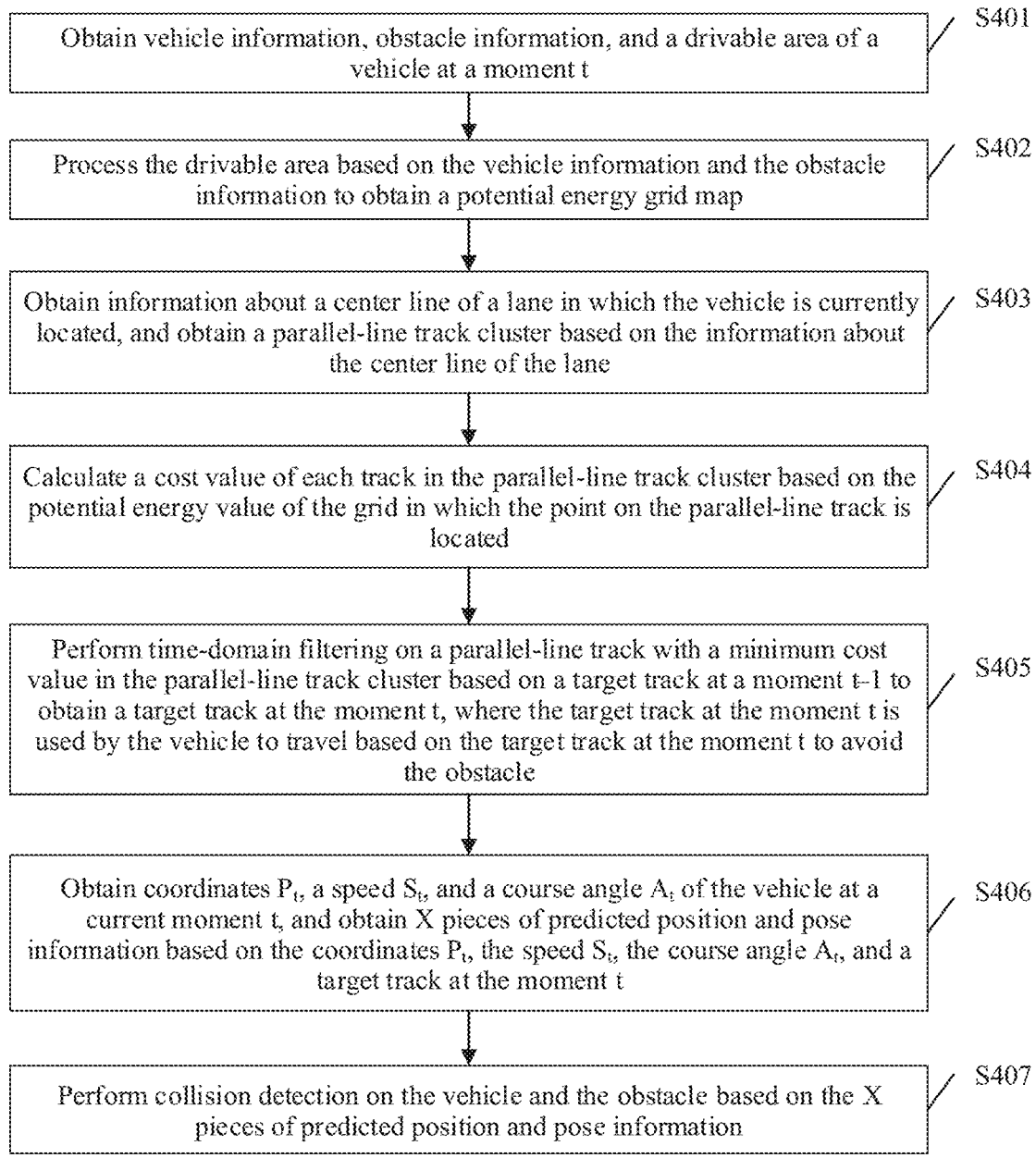
FIG. 4 is a schematic flowchart of an obstacle avoidance method according to an embodiment of the present invention.

Refer to FIG. 4. FIG. 4 is a schematic flowchart of an obstacle avoidance method according to an embodiment of the present invention. As shown in FIG. 4, the method includes the following steps.

S401. Obtain vehicle information, obstacle information, and a drivable area of a vehicle at a moment t.

The vehicle information includes dimensions and coordinates of the vehicle, the obstacle information includes dimensions and coordinates of an obstacle, and both the coordinates of the vehicle and the coordinates of the obstacle are coordinates in an ENU coordinate system. The drivable area is a rectangular area whose size is L*I and that is centered on the vehicle.

It should be noted that the obstacle may include a person or an object (such as a car, a tree, or a person riding a bicycle) that moves or stays still in the drivable area of the vehicle.

S402. Process the drivable area based on the vehicle information and the obstacle information to obtain a potential energy grid map.

Specifically, rasterizing processing is performed on the drivable area to obtain a gird map. The coordinates of the obstacle is converted from the ENU to a vehicle coordinate system based on the coordinates of the vehicle to obtain relative position coordinates of the obstacle. The obstacle is mapped to the grid map according to the dimensions of the vehicle and the relative position coordinates and the dimensions of the obstacle to obtain an occupied area, a hard boundary, and a soft boundary of the obstacle on the grid map, where a distance between the hard boundary and a boundary of the occupied area is D/2, a distance between the soft boundary and the boundary of the occupied area is D, and D is a vehicle width of the vehicle. Potential energy processing is performed on the grid map based on the hard boundary, the soft boundary, and the occupied area to obtain the potential energy grid map.

Potential energy values of grids within the hard boundary are all a, potential energy values of all grids outside the soft boundary are all b, potential energy values of grids between the hard boundary and the soft boundary gradually decrease from c to b along a direction from the hard boundary to the soft boundary, and a is greater than b, c is less than or equal to a, and c is greater than b.

Figure 5:
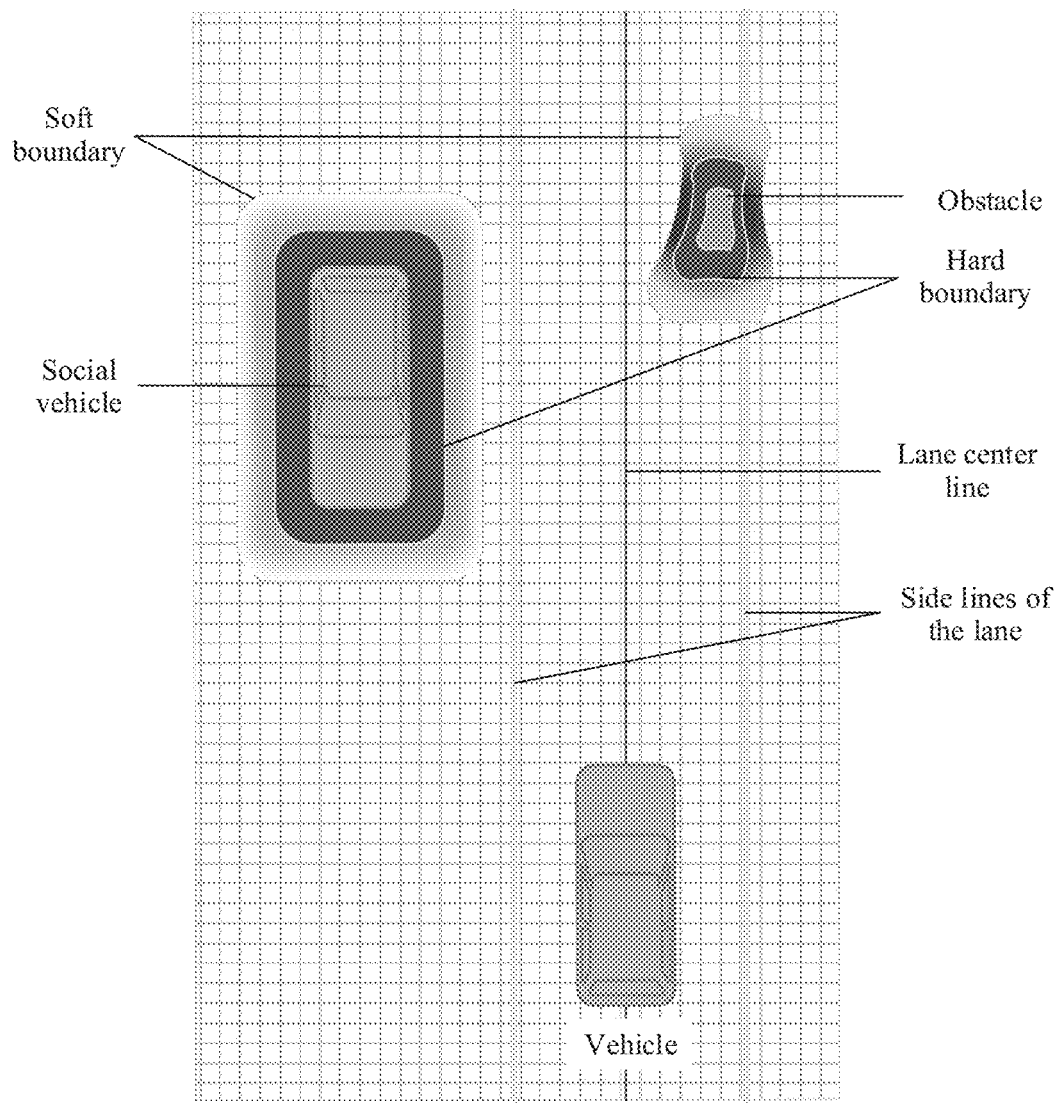
FIG. 5 is a schematic diagram of a potential energy grid map according to an embodiment of the present invention.

A scenario shown in FIG. 5 is used as an example. The vehicle is used as a center, a square with dimensions of 50 m*50 m or a rectangular area with another size is used as a drivable area, and rasterizing processing is performed on the drivable area to obtain a grid map (as shown by a gray grid in FIG. 5). Grid resolution is 0.25 m*0.25 m, that is, dimensions of each grid on the grid map is 0.25 m*0.25 m. The coordinates of the obstacle (including a social vehicle and an obstacle shown in FIG. 5) are converted from the ENU coordinate system to the vehicle coordinate system to obtain the relative position coordinates of the obstacles relative to the vehicle.

Then, the vehicle and the obstacle are mapped to the grid map based on the coordinates and the dimensions of the vehicle and the relative position coordinates and the dimensions of the obstacle to obtain occupied areas, hard boundaries, and soft boundaries of the vehicle and the obstacle on the grid map, where a distance between the hard boundary and a boundary of the occupied area is D/2, a distance between the soft boundary and the boundary of the occupied area is D, and D is a vehicle width of the vehicle. In other words, after an area occupied by the obstacle on the grid map is obtained, two occupied areas (including an area occupied by the social vehicle and an area occupied by the obstacle) are expanded outward based on a half of an actual width of the vehicle, to obtain FIG. 5, a black area shown in FIG. 5. An outer boundary of the black area is the hard boundary. The black area is expanded outward by a half of the actual width of the vehicle, to obtain a gray area shown in FIG. 5. An outer boundary of the gray area is the soft boundary.

Potential energy processing is performed on the grid map based on the hard boundary, the soft boundary, and the occupied area to obtain the potential energy grid map. Potential energy values of all grids within the hard boundary (that is, the black area and the occupied area in FIG. 5) are all a, potential energy values of all grids outside the soft boundary are all b, and potential energy values of grids within the gray area gradually decrease from c to b along the direction from the hard boundary to the soft boundary. For example, the potential energy values of all the grids within the black area are all 1, the potential energy values of all the grids outside the soft boundary are all 0, and the potential energy values of the grids within the gray area decrease from 0.08 to 0 along the direction from the hard boundary to the software boundary.

Potential energy values of grids between the hard boundary and the soft boundary gradually decrease from c to b, particularly, linearly decrease from c to b, along the direction from the hard boundary to the soft boundary.

Figure 6:
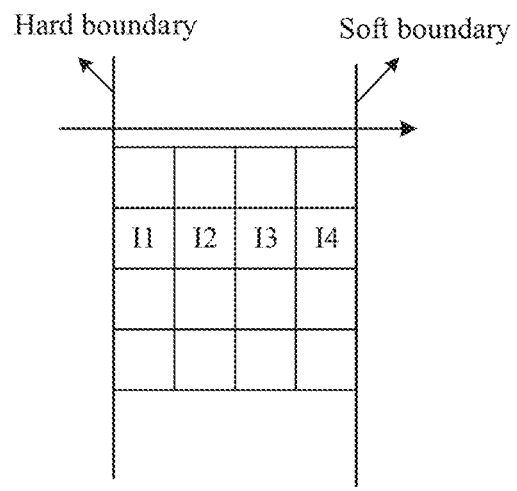
FIG. 6 is a diagram of calculating a potential energy value of a grid in an area between a soft boundary and a hard boundary.

As shown in FIG. 6, there are four grids between the hard boundary and the soft boundary, which are a grid I1, a grid I2, a grid I3, and a grid I4, respectively. A grid on the left of the grid I1 is located in the hard boundary, and a potential energy value thereof is 1. The potential energy values of I1, I2, I3, and I4 are 0.08, 0.06, 0.04, and 0.02, respectively. The grid potential energy on the left of I4 is 0.

In a feasible embodiment, for a grid in an area between a soft boundary and a hard boundary, a potential energy value (the value is a floating-point number) of the grid may be obtained according to a Gaussian filtering algorithm or a mean filtering algorithm, so as to obtain a smooth high-resolution potential energy field.

As shown in FIG. 5, the potential energy value of the grid between the hard boundary and the soft boundary is obtained through calculation according to a Gaussian filtering algorithm or a mean filtering algorithm, to obtain a gray gradient area in which the potential energy value smoothly transits from 1 to 0, and form a complete potential energy field in the current scenario.

It should be noted herein that, after the soft boundary and the hard boundary of the obstacle are determined, the vehicle may be considered as a mass point, to facilitate subsequent calculation. In this application, the social vehicle is also referred to as an obstacle.

S403. Obtain information about a center line of a lane in which the vehicle is currently located, and obtain a parallel-line track cluster based on the information about the center line of the lane.

The information about the center line of the lane includes coordinates of each road point on the center line of the lane. The parallel-line track cluster includes a plurality of parallel-line tracks, and each parallel-line track is parallel to a lane center line.

Specifically, the obtaining the parallel-line track cluster based on the center line information about the lane includes: obtaining the parallel-line track cluster based on the coordinates of the road point on the lane center line and a distance $d_m$, where the distance $d_m$ is a distance between the lane center line and an $m^{th}$ parallel-line track in the parallel-line track cluster.

Further, coordinates of a $k^{th}$ road point on the $m^{th}$ parallel track line are $(x_{mk}^{new}, y_{mk}^{new})$, where $$x_{mk}^{new} = x_k + d_m \times \frac{y_{k+1} - y_k}{\sqrt{(x_{k+1} - x_k)^2 + (y_{k+1} - y_k)^2}}$$

$$y_{mk}^{new} = y_k - d_m \times \frac{x_{k+1} - x_k}{\sqrt{(x_{k+1} - x_i)^2 + (y_{k+1} - y_k)^2}}$$

$(x_k, x_k)$ and $(x_{k+1}, x_{k+1})$ are coordinates of the $k^{th}$ road point and a $(k+1)^{th}$ road point on the lane center line, respectively, and the coordinates are coordinates in the ENU.

It should be noted herein that an absolute value of a distance between an outermost parallel-line track in the parallel-line track cluster and a lane boundary line (also referred herein as a lane side line and shown in FIGS. 5, 7-10) is half of a width of a vehicle, to ensure that the vehicle does not cross the lane boundary line to interact with a vehicle on another lane or affect normal driving of the vehicle on another lane. For example, there are two lane side lines shown in FIG. 5, a left lane side line and a right lane side line that define the left and right boundaries of the lane that the vehicle is on.

In a specific embodiment, a scenario shown in FIG. 3 is used as an example. A distance d between a parallel-line track and a lane center line is first obtained, and then coordinates of a road point on the center line of the lane and a distance d are calculated according to a preset formula, to obtain the coordinates of the road point on the parallel-line track, in this way, the parallel-line track is obtained.

Figure 7:
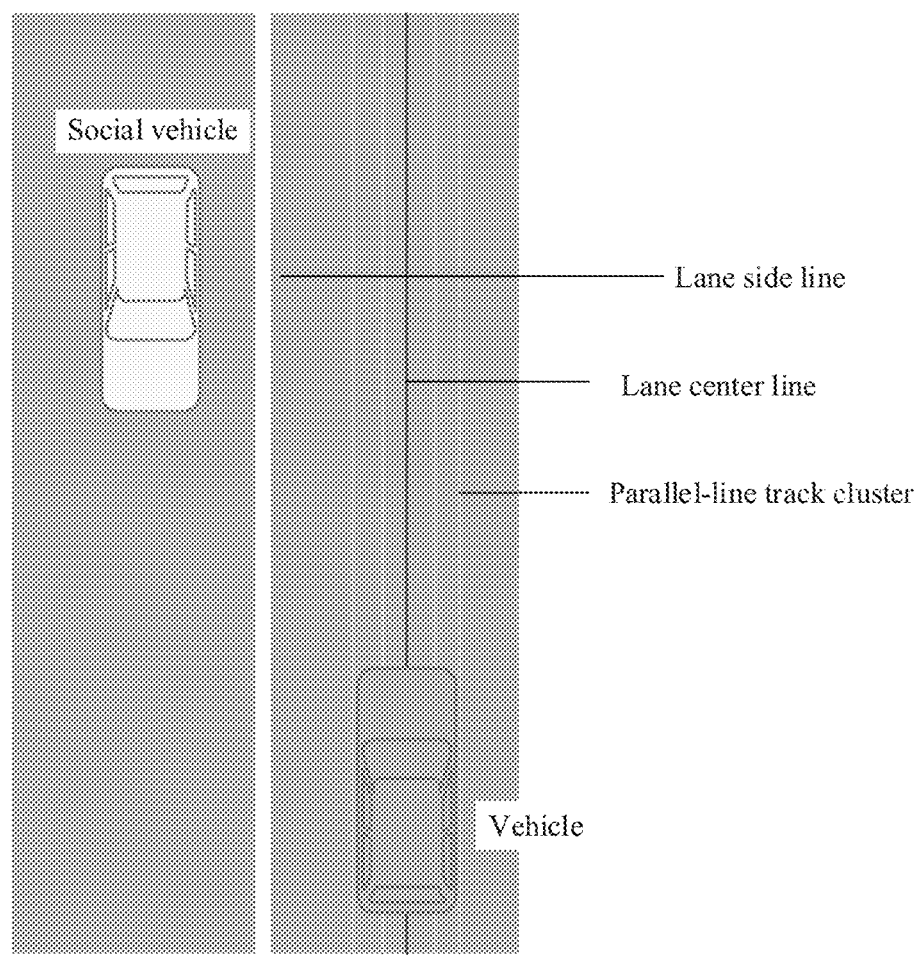
FIG. 7 is a schematic diagram of a parallel-line track cluster on a straight lane.
Figure 8:
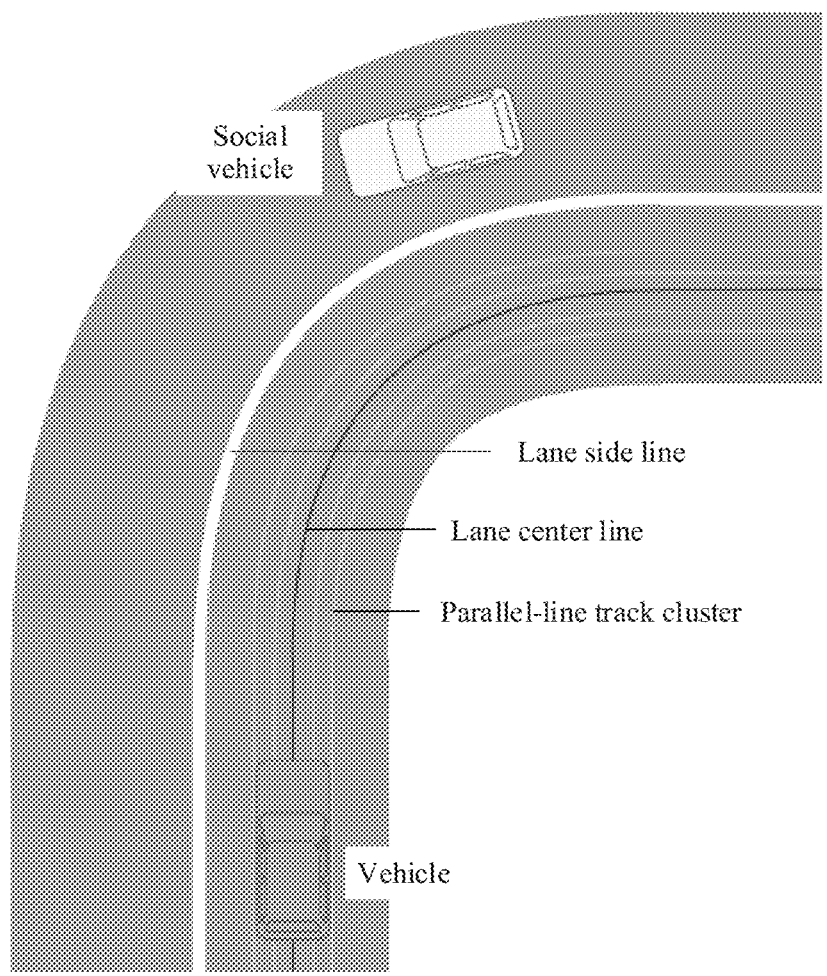
FIG. 8 is a schematic diagram of a parallel-line track cluster on a bend.

Different values, for example, −0.8 m, −0.4 m, 0.4 m, and 0.8 m, are selected for the distance d, and the foregoing steps are repeatedly performed, to obtain the parallel-line track cluster. In the scenario shown in FIG. 3, when the interval d is −1.6 m or 1.6 m, that is, the distance between the generated parallel-line track and the lane boundary is less than half of the vehicle width, generation of a new parallel-line track is stopped, a parallel-line track shown by a white thin line in FIG. 7 is finally obtained as a parallel-line track cluster. For a specific process of generating the parallel-line track cluster in a bend, refer to the process of generating the parallel-line track cluster in FIG. 7. Details are not described herein again. A parallel-line track cluster generated in the bend is shown in FIG. 8. A value of the distance d may be adjusted according to different scenarios, so as to generate parallel-line track clusters of different densities.

It should be noted herein that, if d is a negative number, it indicates that the parallel-line track is located on the left side of the lane center line, and if d is a positive number, it indicates that the parallel-line track is located on the right side of the lane center line. Alternatively, if d is a negative number, it indicates that the parallel-line track is located on the right side of the lane center line; or if d is a positive number, it indicates that the parallel-line track is located on the left side of the lane center line.

S404. Calculate a cost value of each track in the parallel-line track cluster based on the potential energy value of the grid in which the point on the parallel-line track is located.

A cost value of the $j^{th}$ parallel-line track in the parallel-line track cluster is.

$$\text{TotalCost}_j = w_{background} \cdot a(v) \cdot \text{Offsetcost}(j) + w_{map} \sum_{i=1}^{N} b(i) \cdot c(x_i, y_i) \cdot PM(x_i, y_i)$$

offsetcost(j) is an offset between the $j^{th}$ parallel-line track and the lane center line, and a(v) is a function that is positively correlated to a current vehicle speed of the vehicle. It is ensured that a parallel-line track with a smaller offset is more likely to be selected when the vehicle speed is higher, to ensure comfort, $w_{background}$ is the weight of offsetcost(j), $w_{map}$ is the weight of the obstacle, and $w_{map}$ is greater than $w_{background}$.

$PM(x_i, y_i)$ is a potential energy value of a grid in which an $i^{th}$ road point on the $j^{th}$ parallel-line track is located, and b(i) is a function negatively correlated to a distance between the $i^{th}$ road point on the $j^{th}$ parallel-line track and the vehicle. A larger distance between the $i^{th}$ road point and the vehicle indicates a smaller value of b(t), that is, a larger distance between the obstacle and the vehicle indicates smaller impact on selection of a parallel-line track. $c(x_i, y_i)$ is used to indicate a type of the grid in which the $i^{th}$ road point is located. For example, $c(x_i, y_i)$ is 1 if the type of the grid in which the $i^{th}$ road point is located is a grid located within the hard boundary. If the type of the grid in which the $i^{th}$ road point is located is a grid located between the hard boundary and the soft boundary, $c(x_i, y_i)$ is a value less than 0.1. It is ensured, by using different values of $c(x_i, y_i)$ or magnitudes of differences, that a parallel-line track passing through an area within the hard boundary is not selected. The $j^{th}$ parallel-line track is any one of the plurality of parallel-line tracks.

When the weight $w_{map}$ of the obstacle and the weight Offsetcost(j) of the offset are determined, it is ensured that the weight $w_{map}$ of the obstacle is greater than the weight Offsetcost(j) of the offset, and a potential energy value of a grid corresponding to a road point on the parallel-line track within the hard boundary is far greater than a potential energy value of a grid corresponding to a road point on the parallel-line track within the area between the hard boundary and the soft boundary.

Figure 9:
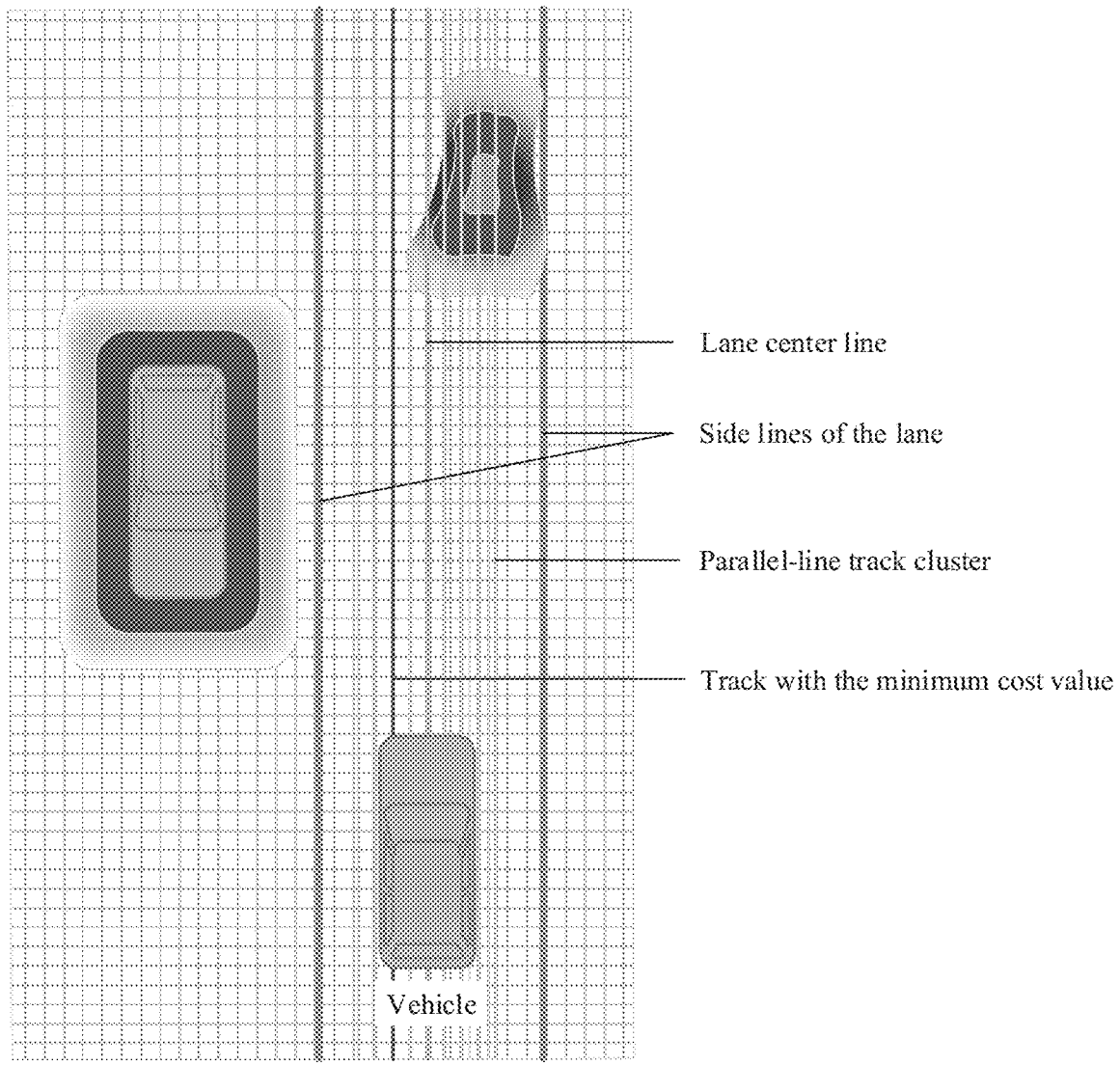
FIG. 9 is a schematic diagram of a position relationship between a cost value of a parallel-line track and an obstacle.

As shown in FIG. 9, because a parallel-line track on a right side of the lane center line passes through the soft and hard boundaries of the obstacle in the potential energy grid map, a cost value of the parallel-line track is relatively high. Because a parallel-line track on a left-most side of the lane center line is relatively far away from the lane center line, a cost value of the parallel-line track is also relatively high. A parallel-line track with a minimum cost value is relatively close to the lane center line and outside the soft and hard boundaries of the obstacle.

S405. Perform time-domain filtering on a parallel-line track with a minimum cost value in the parallel-line track cluster based on a target track at a moment t−1 to obtain a target track at the moment t, where the target track at the moment t is used by the vehicle to travel based on the target track at the moment t to avoid the obstacle.

It should be noted herein that the performing time-domain filtering on a parallel-line track with a minimum cost value in the parallel-line track cluster based on a target track at a moment t−1 to obtain a target track at the moment t specifically means that the vehicle moves from the target track at the moment t−1 to the parallel-line track with the minimum cost value in the parallel-line track cluster, to obtain the target track at the moment t. The target track at the moment t may be considered to be located between the target track at the moment t−1 and the parallel-line track with the minimum cost value in the parallel-line track cluster.

Because the target track at the moment t is obtained based on the target track at the moment t−1 and the parallel-line track with the minimum cost value in the parallel-line track cluster, it can be ensured that an initial position of the target track at the moment t is not a current position of the vehicle, so that the target track is decoupled from the position of the vehicle to prevent system oscillation caused by a delay of a control system and a response time of an execution mechanism of the vehicle. This ensures safety and smoothness of the vehicle in a driving process when the vehicle drives and avoids the obstacle based on the target track.

Figure 10:
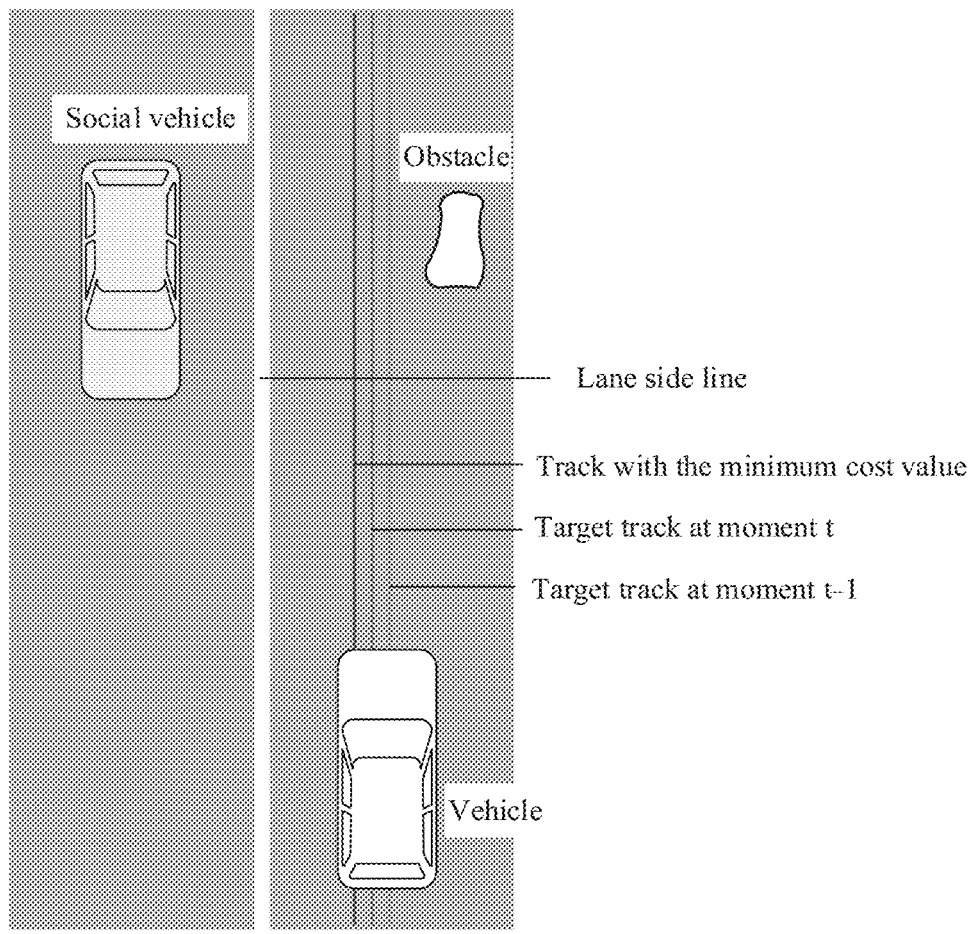
FIG. 10 is a schematic diagram of a target track obtained after filtering.

A position relationship between the target track at the moment t, the target track at the moment t−1, and the parallel-line track with the minimum cost value is shown in FIG. 10.

S406. Obtain coordinates $P_t$, a speed $S_t$, and a course angle $A_t$ of the vehicle at a current moment t, and obtain X pieces of predicted position and pose information based on the coordinates $P_t$, the speed $S_t$, the course angle $A_t$, and a target track at the moment t.

The position and pose information includes coordinates and a course angle.

Specifically, the obtaining X pieces of predicted position and pose information based on the coordinates $P_t$, the speed $S_t$, the course angle $A_t$, and the target track includes:

inputting coordinates $P_{t+x\Delta t}$, a speed $S_{t+x\Delta t}$, a course angle $A_{t+x\Delta t}$, and the target track at the moment t into a prediction model at a moment t+xΔt, to calculate a speed $S_{t+(x+1)\Delta t}$ and predicted position and pose information $I_{t+(x+1)\Delta t}$ of the vehicle at the moment t+xΔt, where the predicted position and pose information $I_{t+(x+1)\Delta t}$ includes coordinates $P_{t+(x+1)\Delta t}$ and a course angle $A_{t+(x+1)\Delta t}$; where the X pieces of predicted position and pose information include the predicted position and pose information, Δt is a predicted step, and x=0, 1, 2, . . . , or X−1.

The prediction model is implemented on the basis of vehicle dynamics, kinematics and controllers.

The coordinates $P_t$ and the course angle $A_t$ are based on the geodetic coordinate system, that is, the X pieces of predicted position and pose information are based on the geodetic coordinate system.

In other words, the coordinates $P_t$, the speed $S_t$, and the course angle $A_t$ of the vehicle at the current moment t and the target track at the moment t are input into a self-driving controller that is based on a parallel system, a speed and position and pose information (including coordinates and a course angle) of the vehicle that are predicted at a next moment (that is, a moment t+Δt) are obtained based on a vehicle dynamics or kinematics model, and then the newly obtained speed and position and pose information are further input into the self-driving controller. The foregoing steps are repeated X times to obtain X pieces of future predicted position and pose information.

In a feasible embodiment, in S401 and S406, obtaining the coordinates of the vehicle may be simultaneously performed.

S407. Perform collision detection on the vehicle and the obstacle based on the X pieces of predicted position and pose information.

Figure 11:
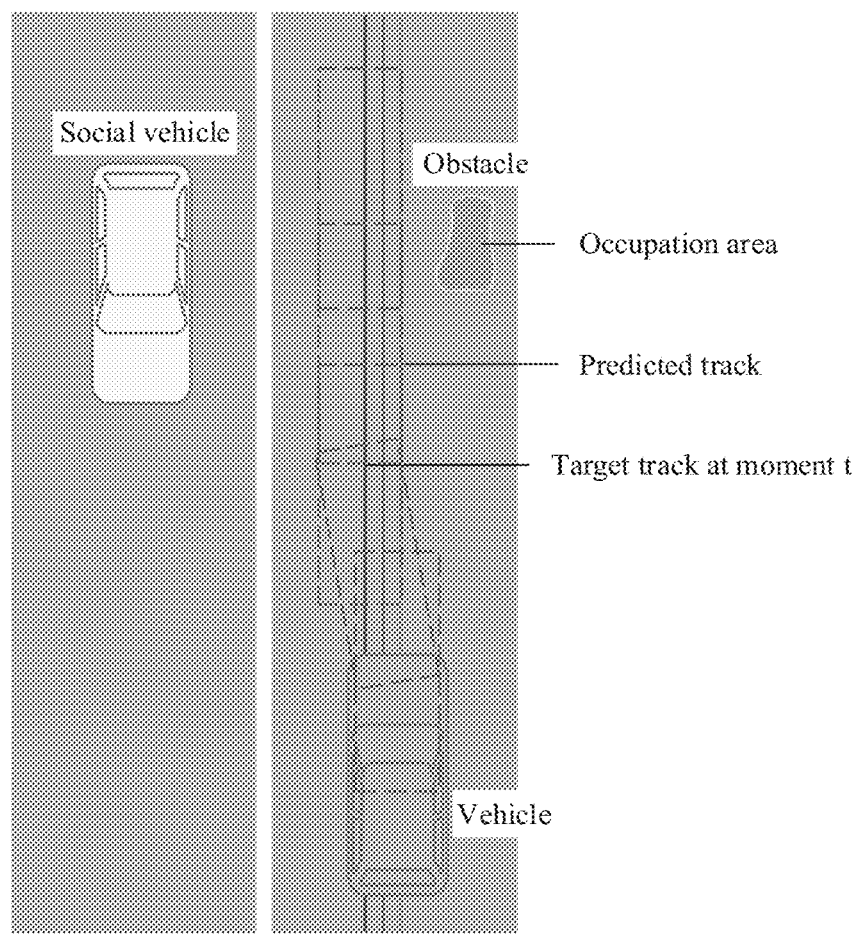
FIG. 11 is a schematic diagram of collision detection according to an embodiment of the present invention.
Figure 12:
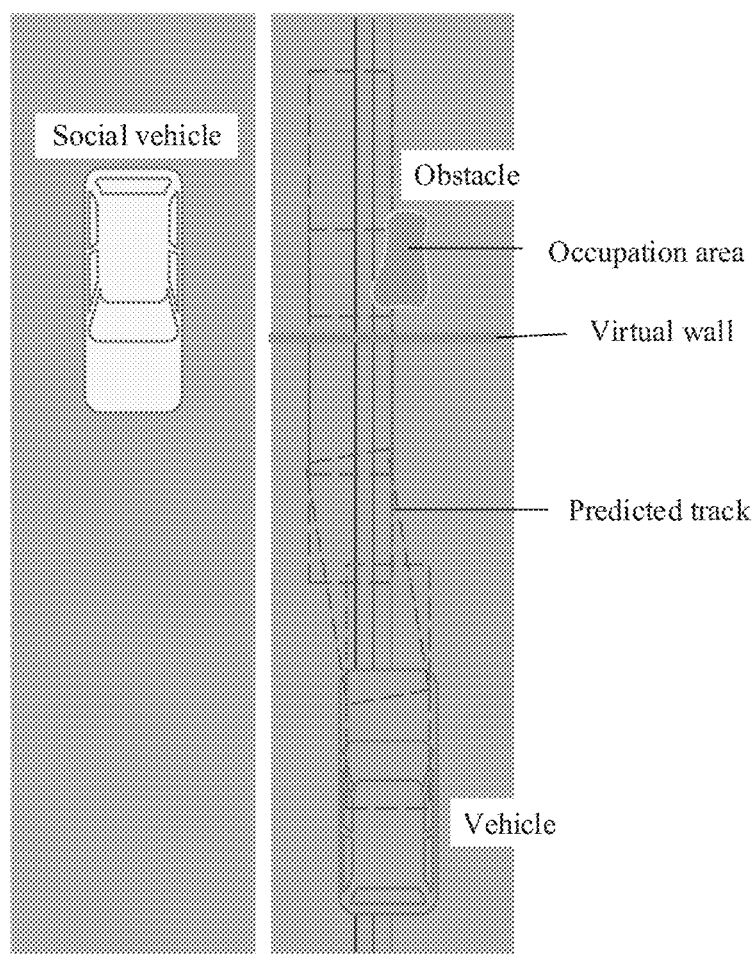
FIG. 12 is a schematic diagram of a position relationship between a virtual wall and an obstacle.

Specifically, coverage areas of the vehicle at X consecutive moments are obtained based on the X pieces of predicted position and pose information. A dashed rectangular area shown in FIG. 11 and FIG. 12 is a coverage area of the vehicle, and a gray area surrounded by a white line is an occupation area of the obstacle. The coverage areas of the vehicle at the X consecutive moments may be considered as a predicted track, and a difference between two adjacent moments is Δt, that is, a predicted step. Then, it is determined whether the coverage areas of the vehicle at the X consecutive moments overlap the occupation area of the obstacle. If it is determined that the coverage areas of the vehicle at the X consecutive moments do not overlap the occupation area of the obstacle, it is determined that the vehicle does not collide with the obstacle. As shown in FIG. 11, the dashed rectangular areas do not overlap the occupation area of the obstacle, indicating that the vehicle can pass smoothly when there is the obstacle in front. If it is determined that coverage areas of the vehicle at a plurality of consecutive moments overlap the occupation area of the obstacle, as shown in FIG. 12, the dashed rectangular areas overlap the occupation area of the obstacle, it is determined that the vehicle is about to collide with the obstacle, and braking information is sent to a control module of the vehicle to indicate the control module to stop or to decelerate and move forward in front of the obstacle. The control module of the vehicle generates a virtual wall in front of the obstacle, so that the vehicle stops in front of the obstacle to ensure safety.

It should be noted herein that, for a static obstacle, the occupation area of the obstacle shown in FIG. 11 and FIG. 12 is the area occupied by the obstacle on the foregoing grid map. The area occupied by the obstacle on the grid map is based on the vehicle coordinate system, while the X pieces of predicted position and pose information of the vehicle are based on the geodetic coordinate system. Therefore, the X pieces of predicted position and pose information need to be converted to the vehicle coordinate system, to obtain X pieces of predicted position and pose information in the vehicle coordinate system, then the coverage areas of the vehicle at the X consecutive moments are obtained based on the X pieces of predicted position and pose information in the vehicle coordinate system, and then collision detection is performed. A detection method is the same as the foregoing method. In this case, when it is detected that the vehicle is about to collide with the obstacle, the control module of the vehicle generates a virtual wall in front of the obstacle, so that the vehicle stops in front of the obstacle to ensure safety.

For a dynamic obstacle, the occupation area of the obstacle shown in FIG. 11 and FIG. 12 is an envelope area of the obstacle in the geodetic coordinate system. The X pieces of predicted position and pose information of the vehicle are based on the geodetic coordinate system. Therefore, coordinate conversion does not need to be performed before collision detection is performed. A detection method is the same as the foregoing method. In this case, when it is detected that the vehicle is about to collide with the obstacle, the vehicle decelerates and moves forward to ensure driving safety.

Collision detection is performed by using the predicted position and pose information at the plurality of future consecutive moments and the obstacle in the drivable area, so that a collision position and a collision time can be accurately predicted, and thereby safety of a planned route can be ensured in real time.

It should be noted herein that the obstacle avoidance method and subsequent collision detection in this application are not only applied to a scenario in which an obstacle slightly intrudes a current lane of the vehicle, but also may be applied to an entire self-driving process, to ensure driving safety in real time.

In an example, after avoiding the obstacle, the vehicle may continue to drive based on the target track or drive based on a road center line.

It can be learned that in the solution in this embodiment of the present invention, the hard boundary and the soft boundary are introduced based on the obstacle information, and the drivable area of the vehicle is processed based on the hard boundary and the soft boundary to obtain the potential energy grid map. Subsequently, track prediction is performed based on the potential energy grid map. Compared with the prior art, dependence on sensor precision is reduced. Data such as the vehicle speed and a distance between the obstacle and the vehicle is used as a calculation parameter when the cost value is calculated, so that the cost value can accurately reflect an advantage and a disadvantage of a parallel-line track. A parallel-line track with a lowest cost is selected by using the cost value, to ensure safety of the track. A preview time is introduced to perform time-domain filtering on the parallel-line track with the minimum cost value, so that safety and smoothness of driving of the vehicle are ensured when the vehicle drives based on the target track. In addition, because an initial position of a predicted track is not the current position of the vehicle, the predicted track is decoupled from the position of the vehicle to prevent system oscillation caused by a delay of a control system and a response time of an execution mechanism of the vehicle. By introducing collision detection, the safety of vehicle traveling based on the target track can be ensured in real time.

Figure 13:
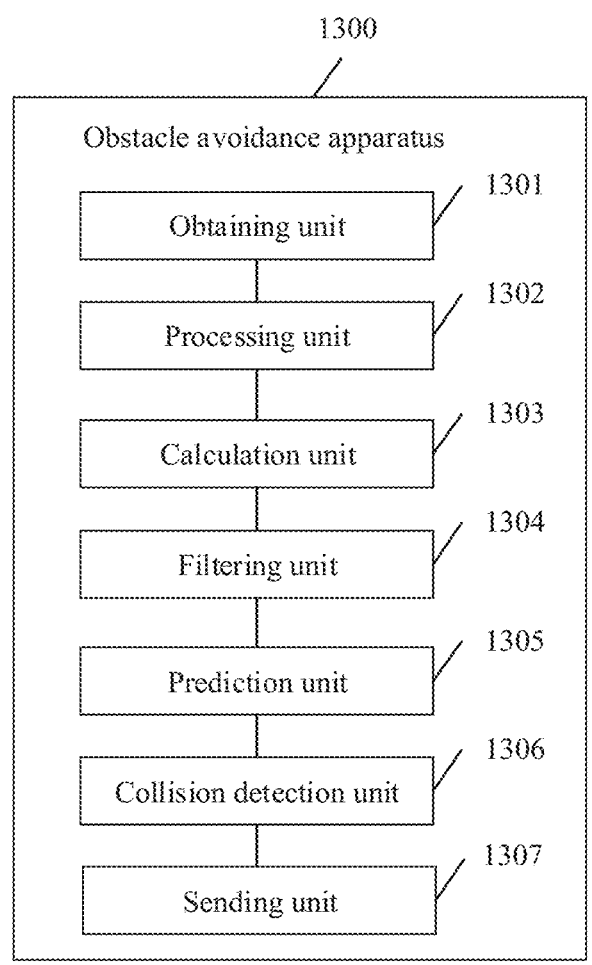
FIG. 13 is a schematic structural diagram of an obstacle avoidance apparatus according to an embodiment of the present invention.

Refer to FIG. 13. FIG. 13 is a schematic structural diagram of an obstacle avoidance apparatus according to an embodiment of the present invention. As shown in FIG. 13, the obstacle avoidance apparatus 1300 includes:

an obtaining unit 1301, configured to obtain vehicle information, obstacle information, and a drivable area of a vehicle at a moment t;

a processing unit 1302, configured to process the drivable area based on the vehicle information and the obstacle information to obtain a potential energy grid map, where each grid in the potential energy grid map corresponds to one piece of potential energy information, and the potential energy information is used to represent a probability that the grid is occupied by an obstacle; where the obtaining unit 1301 is further configured to: obtain information about a lane center line of a lane in which the vehicle is currently located, and obtain a parallel-line track cluster based on the information about the lane center line, where the parallel-line track cluster includes a plurality of parallel-line tracks, and each of the plurality of parallel-line tracks is parallel to the lane center line;

a calculation unit 1303, configured to calculate a cost value of each parallel-line track in the parallel-line track cluster according to the potential energy field grid map; and a filtering unit 1304, configured to perform time-domain filtering on a parallel-line track with a minimum cost value in the parallel-line track cluster based on a target track at a moment t−1 to obtain a target track at the moment t, where the target track at the moment t is used by the vehicle to travel according to the target track at the moment t to avoid the obstacle.

In a feasible embodiment, the vehicle information includes coordinates and dimensions of the vehicle, the obstacle information includes coordinates and dimensions of the obstacle, both the coordinates of the vehicle and the coordinates of the obstacle are coordinates in a geodetic coordinate system ENU, and the processing unit 1302 is specifically configured to:

perform rasterizing processing on the drivable area to obtain a gird map; convert the coordinates of the obstacle from the ENU to a vehicle coordinate system based on the coordinates of the vehicle to obtain relative position coordinates of the obstacle; map the obstacle to the grid map based on the relative position coordinates and the dimensions of the obstacle to obtain an occupied area, a hard boundary, and a soft boundary of the obstacle on the grid map, where a distance between the hard boundary and a boundary of the occupied area is D/2, a distance between the soft boundary and the boundary of the occupied area is D, and D is a vehicle width of the vehicle; and perform potential energy processing on the grid map based on the hard boundary, the soft boundary, and the occupied area to obtain the potential energy grid map; where potential energy values of grids within the hard boundary are all a, potential energy values of all grids outside the soft boundary are all b, potential energy values of grids between the hard boundary and the soft boundary gradually decrease from c to b along a direction from the hard boundary to the soft boundary, and a is greater than b, c is greater than or less than a, and c is greater than b.

In a feasible embodiment, the information about the lane center line includes coordinates of a road point on the lane center line, the coordinates are coordinates in the ENU, and in terms of the obtaining a parallel-line track cluster based on the information about the lane center line, the obtaining unit 1301 is specifically configured to:

obtain the parallel-line track cluster based on the coordinates of the road point on the lane center line and a distance $d_m$, where the distance $d_m$ is a distance between the lane center line and an $m^{th}$ parallel-line track in the parallel-line track cluster.

Further, coordinates of a $k^{th}$ road point on the m parallel track line are $(x_{mk}^{new}, y_{mk}^{new})$, where $$x_{mk}^{new} = x_k + d_m \times \frac{y_{k+1} - y_k}{\sqrt{(x_{k+1} - x_k)^2 + (y_{k+1} - y_k)^2}}$$

$$y_{mk}^{new} = y_k - d_m \times \frac{x_{k+1} - x_k}{\sqrt{(x_{k+1} - x_i)^2 + (y_{k+1} - y_k)^2}}$$

$(x_k, x_k)$ and $(x_{k+1}, x_{k+1})$ are coordinates of the $k^{th}$ road point and a $(k+1)^{th}$ road point on the lane center line, respectively, and the coordinates are coordinates in the ENU.

In a feasible embodiment, a cost value of a $j^{th}$ parallel-line track in the parallel-line track cluster is obtained based on a potential energy value of a grid in which a road point on the $j^{th}$ parallel-line track is located, and the $j^{th}$ parallel-line track is any one of the plurality of parallel-line tracks.

Further, the cost value of the $j^{th}$ parallel-line track is:

$$\text{TotalCost}(j) = w_{background} \cdot a(v) \cdot \text{Offsetcost}(j) + w_{map} \Sigma_{i=1}^{Nb} b(i) \cdot c(x_i, y_i) \cdot PM(x_i, y_i);$$

where Offsetcost(j) is an offset between the $j^{th}$ parallel-line track and a road center line, a(v) is a function positively correlated to a current vehicle speed of the vehicle, $w_{background}$ is a weight of Offsetcost(j), $w_{map}$ is a weight of the obstacle, b(i) is a function negatively correlated to a distance between an $i^{th}$ road point on the $j^{th}$ parallel track line and the vehicle, $c(x_i, y_i)$ is used to indicate a type of a grid in which the $i^{th}$ road point is located. $PM(x_i, y_i)$ is a potential energy value of the grid in which the $i^{th}$ road point is located, and $w_{map}$ is greater than $w_{background}$.

In a feasible embodiment, the obstacle avoidance apparatus 1300 further includes: the obtaining unit 1301, further configured to obtain coordinates $P_t$, a speed $S_t$, and a course angle $A_t$ of the vehicle at the current moment t after the filtering unit 1304 performs time-domain filtering on the parallel-line track with the minimum cost value in the parallel-line track cluster according to the target track at the moment t−1 to obtain the target track at the moment t;

a prediction unit 1305, configured to obtain X pieces of predicted position and pose information based on the coordinates $P_t$, the speed $S_t$, the course angle $A_t$, and the target track, where X is an integer greater than 1;

a collision detection unit 1306, configured to determine, according to predicted position and pose information at a plurality of consecutive moments, whether the vehicle is about to collide with the obstacle; and a sending unit 1307, configured to: if the collision detection unit determines that the vehicle is about to collide with the obstacle, send braking information to a control module of the vehicle to indicate the control module to control the vehicle to stop moving forward before a collision occurs.

In a feasible embodiment, the prediction unit 1305 is specifically configured to:

input coordinates $P_{t+x\Delta t}$, a speed $S_{t+x\Delta t}$, a course angle $A_{t+x\Delta t}$, and the target track at the moment t into a prediction model at a moment t+xΔt, to calculate a speed $S_{t+(x+1)\Delta t}$ and predicted position and pose information $I_{t+(x+1)\Delta t}$ of the vehicle at the moment t+xΔt, where the predicted position and pose information $I_{t+(x+1)\Delta t}$ includes coordinates $P_{t+(x+1)\Delta t}$ and a course angle $A_{t+(x+1)\Delta t}$, where the X pieces of predicted position and pose information include the predicted position and pose information $I_{t+(x+1)\Delta t}$, Δt is a predicted step, and x=0, 1, 2, . . . , or X−1.

It should be noted that the foregoing units (the obtaining unit 1301, the processing unit 1302, the calculation unit 1303, the filtering unit 1304, the prediction unit 1305, the collision detection unit 1306, and the sending unit 1307) are configured to perform related steps of the foregoing method. For example, the obtaining unit 1301 is configured to perform related content in steps S401, S403, and S406; the processing unit 1302 is configured to perform related content in step S402; the calculation unit 1303 is configured to perform related content in step S404; and the prediction unit 1305, the collision detection unit 1306 and the sending unit 1307 are configured to perform related content in steps S406 and S407.

In this embodiment, the obstacle avoidance apparatus 1300 is presented in a form of a unit. The "unit" herein may be an application-specific integrated circuit (ASIC), a processor and a memory that execute one or more software or firmware programs, an integrated logic circuit, and/or another device that can provide the foregoing functions. In addition, the obtaining unit 1301, the processing unit 1302, the calculation unit 1303, the filtering unit 1304, the prediction unit 1305, the collision detection unit 1306, and the sending unit 1307 may be implemented by using the processor 1401 of the obstacle avoidance apparatus shown in FIG. 14.

Figure 14:
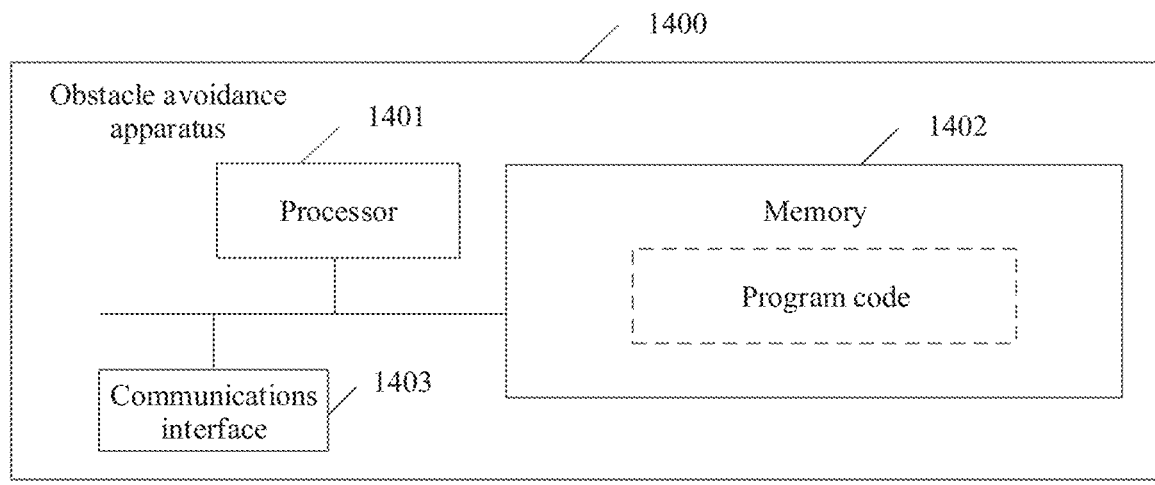
FIG. 14 is a schematic structural diagram of another obstacle avoidance apparatus according to an embodiment of the present invention.

As shown in FIG. 14, the obstacle avoidance apparatus 1400 may be implemented by using a structure in FIG. 14. The obstacle avoidance apparatus 1400 includes at least one processor 1401, at least one memory 1402, and at least one communications interface 1403. The processor 1401, the memory 1402, and the communications interface 1403 are connected to each other and communicate with each other by means of a communication bus.

The processor 1401 may be a general-purpose central processing unit (CPU), a microprocessor, an application-specific integrated circuit (ASIC), or one or more integrated circuits configured to control program execution in the foregoing solution.

The communications interface 1403 is configured to communicate with another device or a communications network, such as an Ethernet, a radio access network (RAN), or a wireless local area network (WLAN).

The memory 1402 may be a read-only memory (ROM) or another type of static storage device capable of storing static information and instructions, a random access memory (RAM), or another type of dynamic storage device capable of storing information and instructions, or may be an electrically erasable programmable read-only memory (EE-PROM), a read-only disc (CD-ROM) or another optical disc storage, an optical disc storage (including a compact disc, a laser disc, an optical disc, a digital versatile disc, a Blue-ray disc, and the like), a magnetic disk storage medium, or another magnetic storage device, or any other medium that can be used to carry or store expected program code in a form of instructions or a data structure and that can be accessed by a computer, but is not limited thereto. The memory may exist independently, and is connected to the processor by means of a bus. Alternatively, the memory may be integrated with the processor.

The memory 1402 is configured to store application program code for implementing the foregoing solutions, and the processor 501 controls the implementation. The processor 1401 is configured to execute the application program code stored in the memory 1402.

The code stored in the memory 1402 may implement the obstacle avoidance method provided above, the method includes: obtaining vehicle information, obstacle information, and a drivable area of a vehicle at a moment t; processing the drivable area based on the vehicle information and the obstacle information to obtain a potential energy grid map, where each grid in the potential energy grid map corresponds to one piece of potential energy information, and the potential energy information is used to represent a probability that the grid is occupied by an obstacle; obtaining information about a lane center line of a lane in which the vehicle is currently located, and obtaining a parallel-line track cluster based on the information about the lane center line, where the parallel-line track cluster includes a plurality of parallel-line tracks, and each of the plurality of parallel-line tracks is parallel to the lane center line; calculating a cost value of each parallel-line track in the parallel-line track cluster according to the potential energy grid map; and performing time-domain filtering on a parallel-line track with a minimum cost value in the parallel-line track cluster based on a target track at a moment t−1 to obtain a target track at the moment t, where the target track at the moment t is used by the vehicle to travel according to the target track at the moment t to avoid the obstacle.

The embodiments of the present invention further provide a computer storage medium. The computer storage medium may store a program, and, when the program is executed, at least a part or all of the steps of any obstacle avoidance method in the foregoing method embodiments may be performed.

Figure 15:
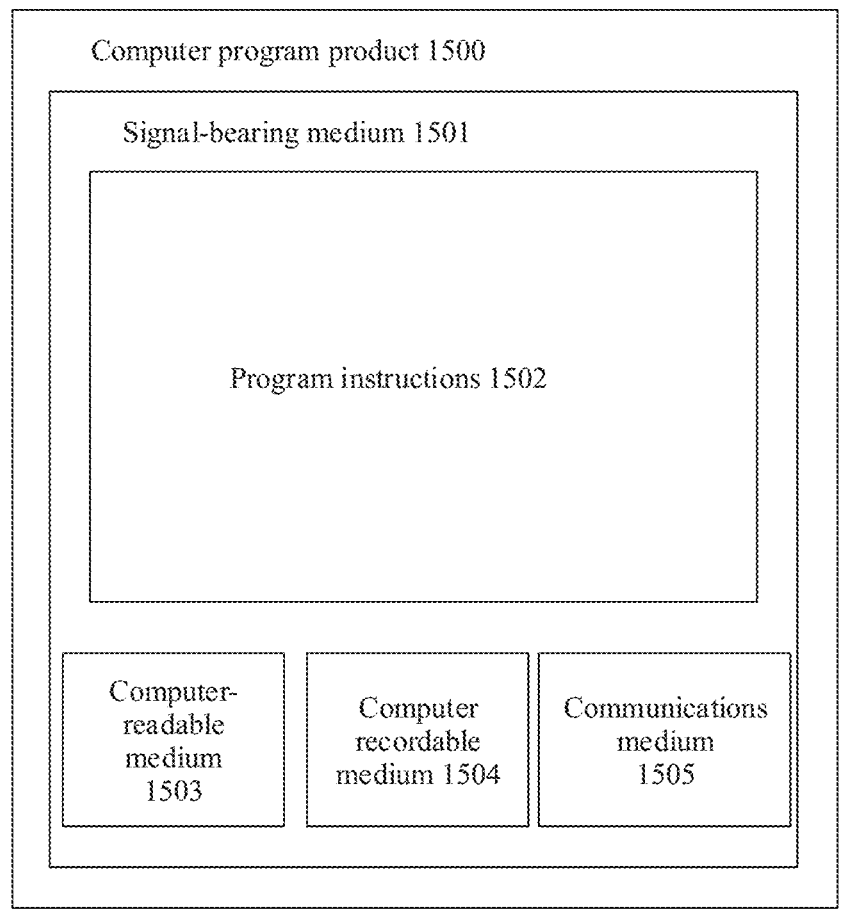
FIG. 15 is a schematic structural diagram of a computer program product according to an embodiment of the present invention.

Program Product Embodiment:

In some embodiments, the disclosed method may be implemented as computer program instructions encoded in a machine readable format on a computer-readable storage medium or encoded on another non-transitory medium or product. FIG. 15 schematically shows a conceptual partial view of an example computer program product arranged according to at least some of the embodiments shown herein, the example computer program product including a computer program for executing a computer process on a computing device. In an embodiment, the example computer program product 1500 is provided using a signal-bearing medium 1501. The signal-bearing medium 1501 may include one or more program instructions 1502 which, when executed by one or more processors, may provide the functions or part of the functions described above in FIG. 4. In addition, the program instructions 1502 in FIG. 15 also describes example instructions.

In some examples, the signal-bearing medium 1501 may include a computer-readable medium 1503, such as but not limited to a hard disk drive, a compact disc (CD), a digital video disc (DVD), a digital tape, a memory, a read-only memory (ROM), or a random access memory (RAM), and the like. In some implementations, the signal-bearing medium 1501 may include a computer recordable medium 1504, such as but not limited to a memory, a read/write (R/W) CD, an R/W DVD, and the like. In some implementations, the signal-bearing medium 1501 may include a communications medium 1505, such as but not limited to, a digital and/or analog communications medium (for example, an optical fiber cable, a waveguide, a wired communication link, a wireless communication link, and the like). Therefore, for example, the signal-bearing medium 1501 may be communicated by using a wireless communications medium 1505 (for example, a wireless communications medium that complies with the IEEE 802.11 standard or other transmission protocols). The one or more program instructions 1502 may be, for example, computer-executable instructions or logic-implementable instructions. In some examples, a computing device such as the one described in FIG. 4 may be configured to provide various operations, functions or actions in response to one or more program instructions 1502 communicated to the computing device through the computer-readable medium 1503, the computer recordable medium 1504, and/or the communications medium 1505. It should be understood that the arrangement described herein is merely for the purpose of the example. Thus, it will be understood by those skilled in the art that other arrangements and other elements (e.g., machines, interfaces, functions, sequences, and groups of functions, etc.) can be used instead, and that some elements may be omitted together according to the desired result. In addition, many of the described elements are functional entities that can be implemented as discrete or distributed components, or implemented in any suitable combination and location in combination with other components.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely exemplary. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

Persons of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM for short), a random access memory (RAM for short), a magnetic disk, and an optical disc.

The remote radio unit provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. An obstacle avoidance method, comprising:
   obtaining vehicle information, obstacle information, and a drivable area of a vehicle at a moment t;
   processing the drivable area based on the vehicle information and the obstacle information to obtain a potential energy grid map, wherein each grid in the potential energy grid map corresponds to a piece of potential energy information that represents a probability that the grid is occupied by an obstacle;
   obtaining information about a lane center line of a lane in which the vehicle is currently located;
   obtaining a parallel-line track cluster based on the information about the lane center line, wherein the parallel-line track cluster comprises a plurality of parallel-line tracks, wherein each parallel-line track of the plurality of parallel-line tracks is parallel to the lane center line, and wherein at least one parallel-line track of the plurality of parallel-line tracks passes through the obstacle;
   calculating a cost value of each parallel-line track in the parallel-line track cluster according to the potential energy grid map; and
   performing time-domain filtering on a parallel-line track with a minimum cost value in the parallel-line track cluster based on a target track at a moment t−1 to obtain a target track at the moment t, wherein the target track at the moment t specifies a parallel line track that is used by the vehicle to avoid the obstacle.

2. The method according to claim 1, wherein the vehicle information comprises coordinates and dimensions of the vehicle, wherein the obstacle information comprises coordinates of the obstacle and dimensions of the obstacle, wherein both the coordinates of the vehicle and the coordinates of the obstacle are coordinates in an East-North-Up geodetic coordinate system (ENU), and wherein processing the drivable area based on the vehicle information and the obstacle information to obtain the potential energy grid map comprises:
   performing rasterizing processing on the drivable area to obtain a grid map;
   converting the coordinates of the obstacle from the ENU to a vehicle coordinate system based on the coordinates of the vehicle to obtain relative position coordinates of the obstacle;
   mapping the obstacle to the grid map based on the relative position coordinates of the obstacle and the dimensions of the obstacle to obtain an occupied area, a hard boundary, and a soft boundary of the obstacle on the grid map, wherein a distance between the hard boundary and a boundary of the occupied area is D/2, wherein a distance between the soft boundary and the boundary of the occupied area is D, and wherein D is a vehicle width of the vehicle; and performing potential energy processing on the grid map based on the hard boundary, the soft boundary, and the occupied area to obtain the potential energy grid map, wherein (1) potential energy values of grids within the hard boundary are all a, (2) potential energy values of all grids outside the soft boundary are all b, (3) potential energy values of grids between the hard boundary and the soft boundary gradually decrease from c to b along a direction from the hard boundary to the soft boundary, and (4) a is greater than b, c is less than or equal to a, and c is greater than b.

3. The method according to claim 2, wherein a cost value of a $j^{th}$ parallel-line track in the parallel-line track cluster is obtained based on a potential energy value of a grid in which a road point on the $j^{th}$ parallel-line track is located, and wherein the $j^{th}$ parallel-line track is any one of the plurality of parallel-line tracks.

4. The method according to claim 1, wherein the information about the lane center line comprises coordinates of a road point on the lane center line, wherein the coordinates are coordinates in an ENU, and wherein obtaining the parallel-line track cluster based on the information about the lane center line comprises:
obtaining the parallel-line track cluster based on the coordinates of the road point on the lane center line and a distance $d_m$, wherein the distance $d_m$ is a distance between the lane center line and an $m^{th}$ parallel-line track in the parallel-line track cluster.

5. The method according to claim 1, wherein after performing time-domain filtering on the parallel-line track with the minimum cost value in the parallel-line track cluster based on the target track at the moment t−1 to obtain the target track at the moment t, the method further comprises:
obtaining coordinates $P_t$, a speed $S_t$, and a course angle $A_t$ of the vehicle at the moment t;
obtaining X pieces of predicted position and pose information based on the coordinates $P_t$, the speed $S_t$, the course angle $A_t$, and the target track at the moment t, wherein X is an integer greater than 1;
determining, based on the X pieces of predicted position and pose information, whether the vehicle is about to collide with the obstacle; and
in response to determining that the vehicle is about to collide with the obstacle, sending braking information to a control module of the vehicle to indicate that the control module is to control the vehicle to stop moving forward or to decelerate and move forward before a collision occurs.

6. The method according to claim 5, wherein obtaining the X pieces of predicted position and pose information based on the coordinates $P_t$, the speed $S_t$, the course angle $A_t$, and the target track at the moment t comprises:
inputting coordinates $P_{t+x\Delta t}$, a speed $S_{t+x\Delta t}$, a course angle $A_{t+x\Delta t}$, and the target track at the moment t into a prediction model at a moment $t+x\Delta t$, to calculate a speed $S_{t+(x+1)\Delta t}$ and predicted position and pose information $I_{t+(x+1)\Delta t}$ of the vehicle at the moment $t+x\Delta t$, wherein the predicted position and pose information $I_{t+(x+1)\Delta t}$ comprises coordinates $P_{t+(x+1)\Delta t}$ and a course angle $A_{t+(x+1)\Delta t}$, wherein the X pieces of predicted position and pose information comprise the predicted position and pose information $I_{t+(x+1)\Delta t}$, wherein $\Delta t$ is a predicted step, and wherein x=0, 1, 2, . . . , or X−1.

7. An obstacle avoidance apparatus, comprising:
at least one processor; and
one or more memories coupled to the at least one processor and storing programming instructions for execution by the at least one processor to perform operations comprising:
obtaining vehicle information, obstacle information, and a drivable area of a vehicle at a moment t;
processing the drivable area based on the vehicle information and the obstacle information to obtain a potential energy grid map, wherein each grid in the potential energy grid map corresponds to a piece of potential energy information that represents a probability that the grid is occupied by an obstacle;
obtaining information about a lane center line of a lane in which the vehicle is currently located;
obtaining a parallel-line track cluster based on the information about the lane center line, wherein the parallel-line track cluster comprises a plurality of parallel-line tracks, wherein each of the plurality of parallel-line tracks is parallel to the lane center line, and wherein at least one parallel-line track of the plurality of parallel-line tracks passes through the obstacle;
calculating a cost value of each parallel-line track in the parallel-line track cluster according to the potential energy grid map; and
performing time-domain filtering on a parallel-line track with a minimum cost value in the parallel-line track cluster based on a target track at a moment t−1 to obtain a target track at the moment t, wherein the target track at the moment t specifies a parallel line track that is used by the vehicle to avoid the obstacle.

8. The apparatus according to claim 7, wherein the vehicle information comprises coordinates and dimensions of the vehicle, wherein the obstacle information comprises coordinates of the obstacle and dimensions of the obstacle, wherein both the coordinates of the vehicle and the coordinates of the obstacle are coordinates in an East-North-Up geodetic coordinate system (ENU), and wherein processing the drivable area based on the vehicle information and the obstacle information to obtain the potential energy grid map comprises:
performing rasterizing processing on the drivable area to obtain a grid map;
converting the coordinates of the obstacle from the ENU to a vehicle coordinate system based on the coordinates of the vehicle to obtain relative position coordinates of the obstacle;
mapping the obstacle to the grid map based on the relative position coordinates of the obstacle and the dimensions of the obstacle to obtain an occupied area, a hard boundary, and a soft boundary of the obstacle on the grid map, wherein a distance between the hard boundary and a boundary of the occupied area is D/2, wherein a distance between the soft boundary and the boundary of the occupied area is D, and wherein D is a vehicle width of the vehicle; and
performing potential energy processing on the grid map based on the hard boundary, the soft boundary, and the occupied area to obtain the potential energy grid map, wherein (1) potential energy values of grids within the hard boundary are all a, (2) potential energy values of all grids outside the soft boundary are all b, (3) potential energy values of grids between the hard boundary and the soft boundary gradually decrease from c to b along a direction from the hard boundary to the soft boundary, and (4) a is greater than b, c is less than or equal to a, and c is greater than b.

9. The apparatus according to claim 8, wherein a cost value of a $j^{th}$ parallel-line track in the parallel-line track cluster is obtained based on a potential energy value of a grid in which a road point on the $j^{th}$ parallel-line track is located, and wherein the $j^{th}$ parallel-line track is any one of the plurality of parallel-line tracks.

10. The apparatus according to claim 7, wherein the information about the lane center line comprises coordinates of a road point on the lane center line, wherein the coordinates are coordinates in an ENU, and wherein obtaining the parallel-line track cluster based on the information about the lane center line comprises:
    obtaining the parallel-line track cluster based on the coordinates of the road point on the lane center line and a distance $d_m$, wherein the distance $d_m$ is a distance between the lane center line and an $m^{th}$ parallel-line track in the parallel-line track cluster.

11. The apparatus according to claim 7, wherein after performing time-domain filtering on the parallel-line track with the minimum cost value in the parallel-line track cluster based on the target track at the moment t−1 to obtain the target track at the moment t, the at least one processor further to perform operations comprising:
    obtaining coordinates $P_t$, a speed $S_t$, and a course angle $A_t$ of the vehicle at the moment t;
    obtaining X pieces of predicted position and pose information based on the coordinates $P_t$, the speed $S_t$, the course angle $A_t$, and the target track at the moment t, wherein X is an integer greater than 1;
    determining, based on the X pieces of predicted position and pose information, whether the vehicle is about to collide with the obstacle; and
    in response to determining that the vehicle is about to collide with the obstacle, sending braking information to a control module of the vehicle to indicate that the control module is to control the vehicle to stop moving forward or to decelerate and move forward before a collision occurs.

12. The apparatus according to claim 11, wherein obtaining the X pieces of predicted position and pose information based on the coordinates $P_t$, the speed $S_t$, the course angle $A_t$, and the target track at the moment t comprises:
    inputting coordinates $P_{t+x\Delta t}$, a speed $S_{t+x\Delta t}$, a course angle $A_{t+x\Delta t}$, and the target track at the moment t into a prediction model at a moment t+xΔt, to calculate a speed $S_{t+(x+1)\Delta t}$ and predicted position and pose information $I_{t+(x+1)\Delta t}$ of the vehicle at the moment t+xΔt, wherein the predicted position and pose information $I_{t+(x+1)\Delta t}$ comprises coordinates $P_{t+(x+1)\Delta t}$ and a course angle $A_{t+(x+1)\Delta t}$,
    wherein the X pieces of predicted position and pose information comprise the predicted position and pose information $I_{t+(x+1)\Delta t}$, wherein Δt is a predicted step, and wherein x=0, 1, 2, . . . , or X−1.

13. A non-transitory, computer-readable storage medium storing one or more program instructions executable by at least one processor to perform operations comprising:
    obtaining vehicle information, obstacle information, and a drivable area of a vehicle at a moment t;
    processing the drivable area based on the vehicle information and the obstacle information to obtain a potential energy grid map, wherein each grid in the potential energy grid map corresponds to a piece of potential energy information that represents a probability that the grid is occupied by an obstacle;
    obtaining information about a lane center line of a lane in which the vehicle is currently located;
    obtaining a parallel-line track cluster based on the information about the lane center line, wherein the parallel-line track cluster comprises a plurality of parallel-line tracks, wherein each of the plurality of parallel-line tracks is parallel to the lane center line, and wherein at least one parallel-line track of the plurality of parallel-line tracks passes through the obstacle;
    calculating a cost value of each parallel-line track in the parallel-line track cluster according to the potential energy grid map; and
    performing time-domain filtering on a parallel-line track with a minimum cost value in the parallel-line track cluster based on a target track at a moment t−1 to obtain a target track at the moment t, wherein the target track at the moment t specifies a parallel line track that is used by the vehicle to avoid the obstacle.

14. The non-transitory, computer-readable storage medium according to claim 13, wherein the vehicle information comprises coordinates and dimensions of the vehicle, wherein the obstacle information comprises coordinates of the obstacle and dimensions of the obstacle, wherein both the coordinates of the vehicle and the coordinates of the obstacle are coordinates in an East-North-Up geodetic coordinate system ENU), and wherein processing the drivable area based on the vehicle information and the obstacle information to obtain the potential energy grid map comprises:
    performing rasterizing processing on the drivable area to obtain a grid map;
    converting the coordinates of the obstacle from the ENU to a vehicle coordinate system based on the coordinates of the vehicle to obtain relative position coordinates of the obstacle;
    mapping the obstacle to the grid map based on the relative position coordinates of the obstacle and the dimensions of the obstacle to obtain an occupied area, a hard boundary, and a soft boundary of the obstacle on the grid map, wherein a distance between the hard boundary and a boundary of the occupied area is D/2, wherein a distance between the soft boundary and the boundary of the occupied area is D, and wherein D is a vehicle width of the vehicle; and
    performing potential energy processing on the grid map based on the hard boundary, the soft boundary, and the occupied area to obtain the potential energy grid map, wherein (1) potential energy values of grids within the hard boundary are all a, (2) potential energy values of all grids outside the soft boundary are all b, (3) potential energy values of grids between the hard boundary and the soft boundary gradually decrease from c to b along a direction from the hard boundary to the soft boundary, and (4) a is greater than b, c is less than or equal to a, and c is greater than b.

15. The non-transitory, computer-readable storage medium according to claim 14, wherein a cost value of a $j^{th}$ parallel-line track in the parallel-line track cluster is obtained based on a potential energy value of a grid in which a road point on the $j^{th}$ parallel-line track is located, and wherein the $j^{th}$ parallel-line track is any one of the plurality of parallel-line tracks.

16. The non-transitory, computer-readable storage medium according to claim 13, wherein the information about the lane center line comprises coordinates of a road point on the lane center line, wherein the coordinates are coordinates in an ENU, and wherein obtaining the parallel-line track cluster based on the information about the lane center line comprises:

obtaining the parallel-line track cluster based on the coordinates of the road point on the lane center line and a distance $d_m$, wherein the distance $d_m$ is a distance between the lane center line and an $m^{th}$ parallel-line track in the parallel-line track cluster.

17. The non-transitory, computer-readable storage medium according to claim 13, wherein after performing time-domain filtering on the parallel-line track with the minimum cost value in the parallel-line track cluster based on the target track at the moment t−1 to obtain the target track at the moment t, the operations further comprise:

obtaining coordinates $P_t$, a speed $S_t$, and a course angle $A_t$ of the vehicle at the moment t;

obtaining X pieces of predicted position and pose information based on the coordinates $P_t$, the speed $S_t$, the course angle $A_t$, and the target track at the moment t, wherein X is an integer greater than 1;

determining, based on the X pieces of predicted position and pose information, whether the vehicle is about to collide with the obstacle; and in response to determining that the vehicle is about to collide with the obstacle, sending braking information to a control module of the vehicle to indicate that the control module is to control the vehicle to stop moving forward or to decelerate and move forward before a collision occurs.

18. The non-transitory, computer-readable storage medium according to claim 17, wherein obtaining the X pieces of predicted position and pose information based on the coordinates $P_t$, the speed $S_t$, the course angle $A_t$, and the target track at the moment t comprises:

inputting coordinates $P_{t+x\Delta t}$, a speed $S_{t+x\Delta t}$, a course angle $A_{t+x\Delta t}$, and the target track at the moment t into a prediction model at a moment $t+x\Delta t$, to calculate a speed $S_{t+(x+1)\Delta t}$ and predicted position and pose information $I_{t+(x+1)\Delta t}$ of the vehicle at the moment $t+x\Delta t$, wherein the predicted position and pose information $I_{t+(x+1)\Delta t}$ comprises coordinates $P_{t+(x+1)\Delta t}$ and a course angle $A_{t+(x+1)\Delta t}$;

wherein the X pieces of predicted position and pose information comprise the predicted position and pose information $I_{t+(x+1)\Delta t}$, wherein $\Delta t$ is a predicted step, and wherein x=0, 1, 2, . . . , or X−1.

* * * * *

UNITED STATES PATENT AND TRADEMARK OFFICE
CERTIFICATE OF CORRECTION

PATENT NO. : 12,061,088 B2
APPLICATION NO. : 17/317294
DATED : August 13, 2024
INVENTOR(S) : Chao Wang, Xinyu Wang and Shaoyu Yang It is certified that error appears in the above-identified patent and that said Letters Patent is hereby corrected as shown below:

In the Claims

In Column 31, In Line 50, In Claim 12, delete "$S_{t+x+1)\Delta t}$" and insert -- $S_{t+(x+1)\Delta t}$ --.

Signed and Sealed this
Nineteenth Day of November, 2024

Katherine Kelly Vidal
*Director of the United States Patent and Trademark Office*